(12) United States Patent
McDaniel et al.

(10) Patent No.: US 6,706,358 B1
(45) Date of Patent: Mar. 16, 2004

(54) STORAGE DISK COMPRISING DEPRESSIONS AND /OR RAISED FEATURES

(75) Inventors: Terry McDaniel, Morgan Hill, CA (US); John H. Jerman, Palo Alto, CA (US); Karl A. Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/280,418

(22) Filed: Mar. 29, 1999

Related U.S. Application Data

(63) Continuation-in-part of application No. 09/152,356, filed on Sep. 14, 1998, now Pat. No. 6,264,848
(60) Provisional application No. 60/081,253, filed on Apr. 9, 1998, provisional application No. 60/115,094, filed on Jan. 7, 1999, provisional application No. 60/115,771, filed on Jan. 13, 1999, provisional application No. 60/082,077, filed on Apr. 17, 1998, provisional application No. 60/111,099, filed on Dec. 4, 1998, and provisional application No. 60/113,059, filed on Dec. 21, 1998.

(51) Int. Cl.[7] ................................................ B32B 3/02
(52) U.S. Cl. ..................... 428/64.1; 428/64.4; 428/457; 428/913; 430/270.11; 430/945; 369/275.3; 369/283
(58) Field of Search ............................... 428/64.1, 64.2, 428/64.4, 457, 913; 430/270.1, 495.1, 945; 369/275.1, 275.3, 283, 284

(56) References Cited

U.S. PATENT DOCUMENTS

| | | | |
|---|---|---|---|
| 4,855,984 A | 8/1989 | Gerber | 369/54 |
| 4,935,278 A | 6/1990 | Krounbi et al. | 428/64 |
| 5,276,670 A | 1/1994 | Nogami et al. | 369/116 |

(List continued on next page.)

FOREIGN PATENT DOCUMENTS

| | | | | |
|---|---|---|---|---|
| JP | 58017541 | 2/1983 | | |
| JP | 58 017541 | 2/1983 | ............ | G11B/5/74 |
| JP | 01292625 | 11/1989 | | |
| JP | 01 292625 | 11/1989 | ............ | G11B/5/82 |
| JP | 2-61814 | 3/1990 | | |
| WO | WO95/15555 | 1/1993 | | |
| WO | WO 95 1555 A | 6/1995 | ............ | G11B/5/82 |

OTHER PUBLICATIONS

Katayama et al., "New Magnetic Recording Media Using Laser Assisted Read/Write Technologies," presented in paper 13–B–05 at Moris–Magneto–Optical Recording International Symposium '99, on Jan. 10–13, 1999 at Monterey, CA.

Saga et al., "A New Perpendicular Magnetic Recording Method With A Magnetic–Optical Common Preformat," presented in paper 13–B–03 at Moris–Magneto–Optical Recording International Symposium '99, on Jan. 10–13, 1999.

Nemoto et al. "High Density ThermoMagnetic Recording On Flux Detectable RE–TM Media," presented in paper 13–B–04 at Moris–Magneto–Optical Recording International Symposium '99, on Jan. 10–13, 1999.

Saga et al., "A New Recording Method Combining Thermo–Magnetic Writing and Flux Detection," presented in paper Pd–08 at ISOM–International Symposium On Optical Memory '98, on Oct. 20–22, 1998 at Tsukuba, Japan.

Nemoto et al., "Exchange–Coupled Magnetic Bilayer Media For Thermomagnetic Writing And Flux Detection" presented in paper Pd–09at ISOM–International Symposium On Optical Memory '98, on Oct. 20–22, 1998 at Tsukuba, Japan.

*Primary Examiner*—Elizabeth Evans
(74) *Attorney, Agent, or Firm*—Moser, Patterson & Sheridan LLP

(57) ABSTRACT

A data storage disk may include depressions or raised features, which may be filled and/or polished with various materials.

29 Claims, 21 Drawing Sheets

U.S. PATENT DOCUMENTS

| | | | |
|---|---|---|---|
| 5,279,775 A | 1/1994 | Thomas et al. | 264/1.3 |
| 5,285,343 A | 2/1994 | Tanaka et al. | 360/131 |
| 5,353,268 A | 10/1994 | Hintz | 369/13 |
| 5,576,918 A | 11/1996 | Bar-Gadda et al. | 360/135 |
| 5,904,969 A * | 5/1999 | Kamezaki | 428/64.1 |
| 5,968,626 A * | 5/1999 | Ja | 428/64.1 |

* cited by examiner

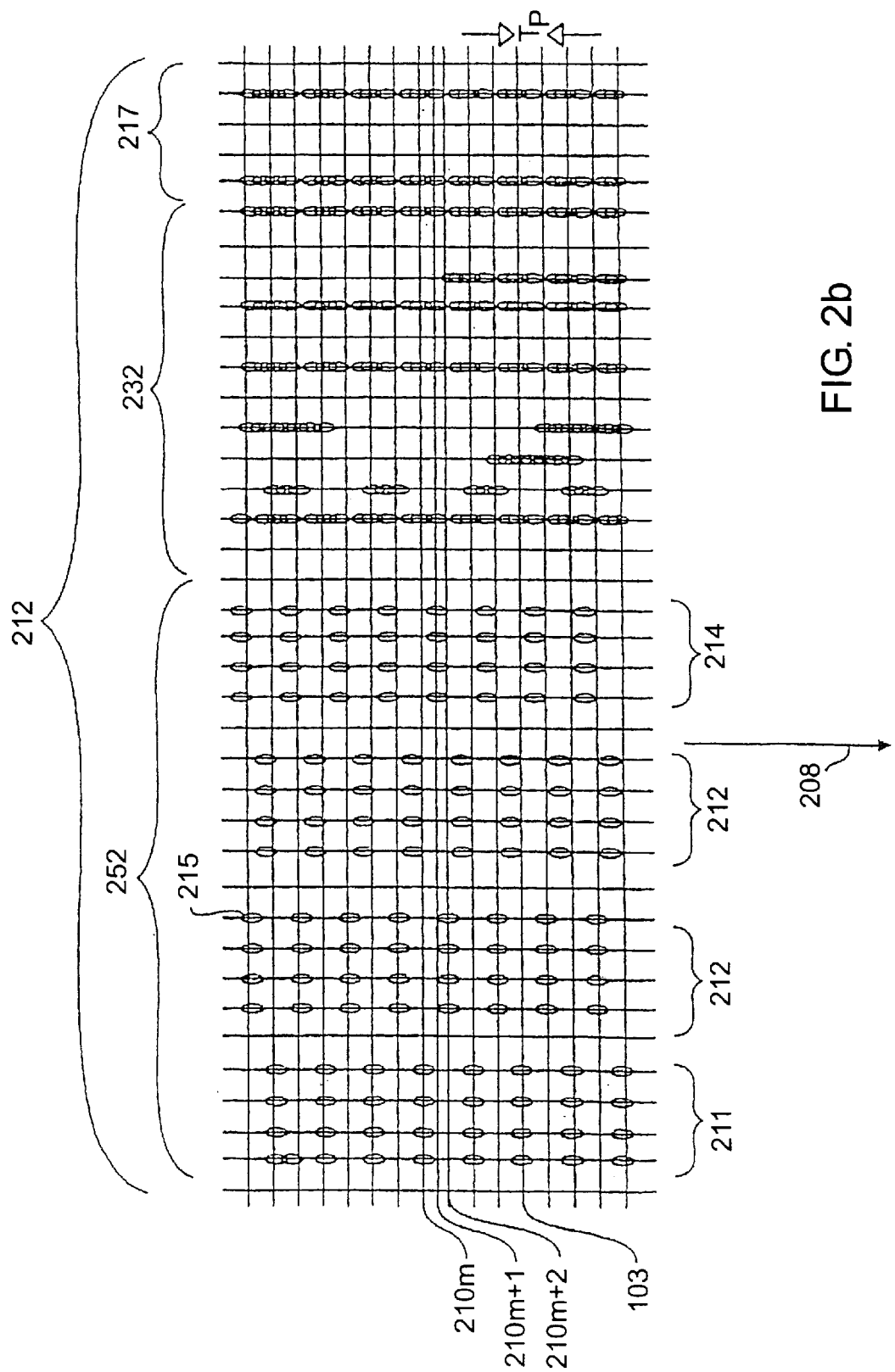

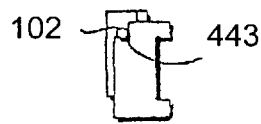
FIG. 4c
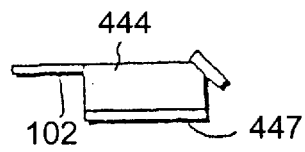
FIG. 4d
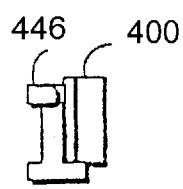
FIG. 4e
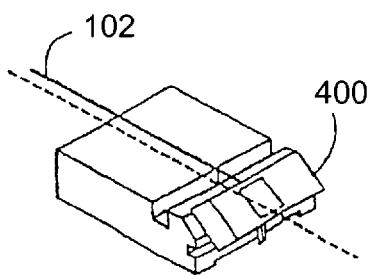
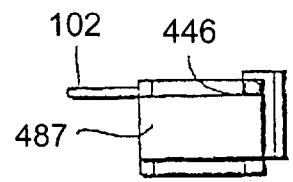
FIG. 4f
FIG. 4g
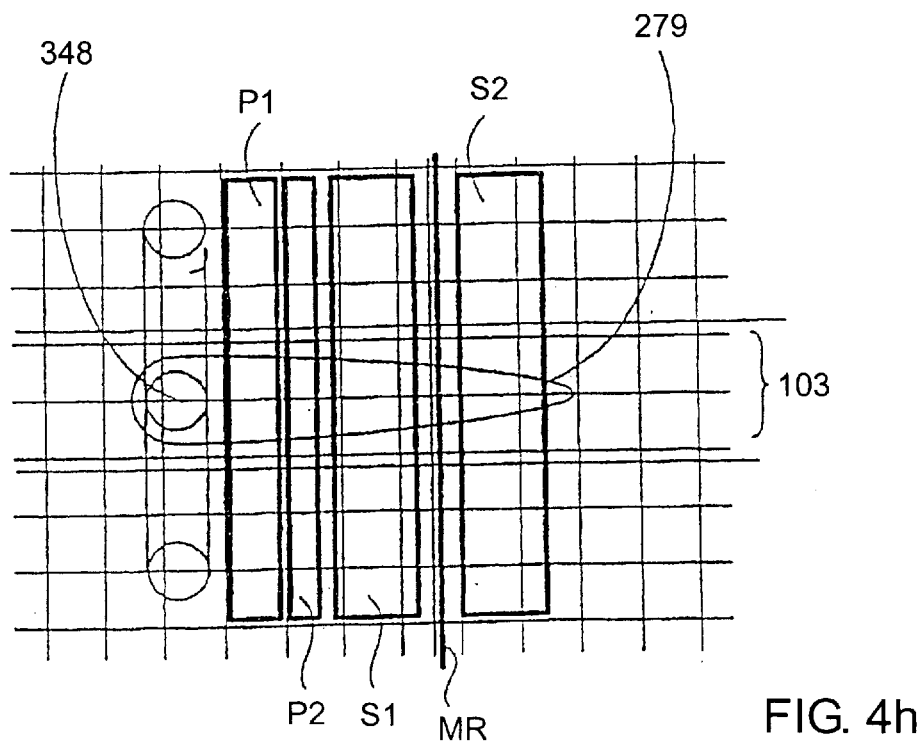
FIG. 4h

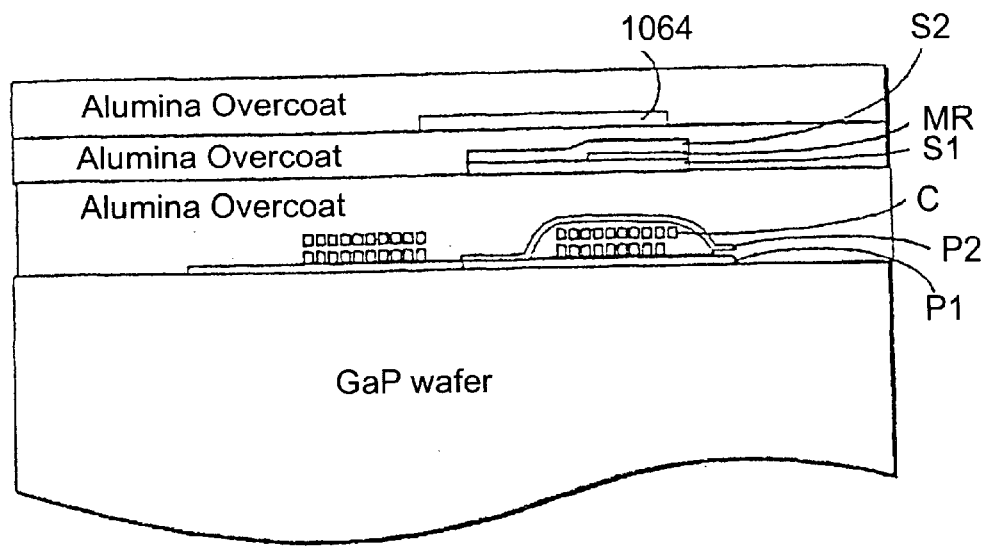
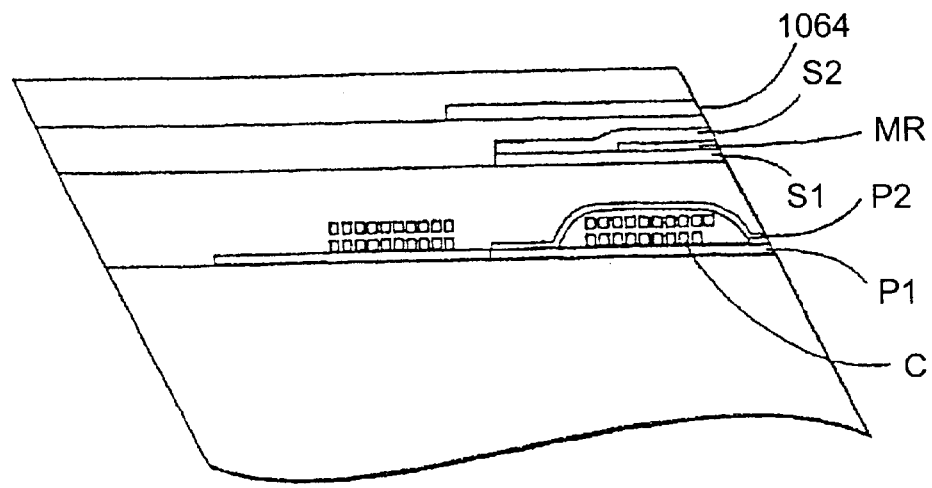
FIG. 4m

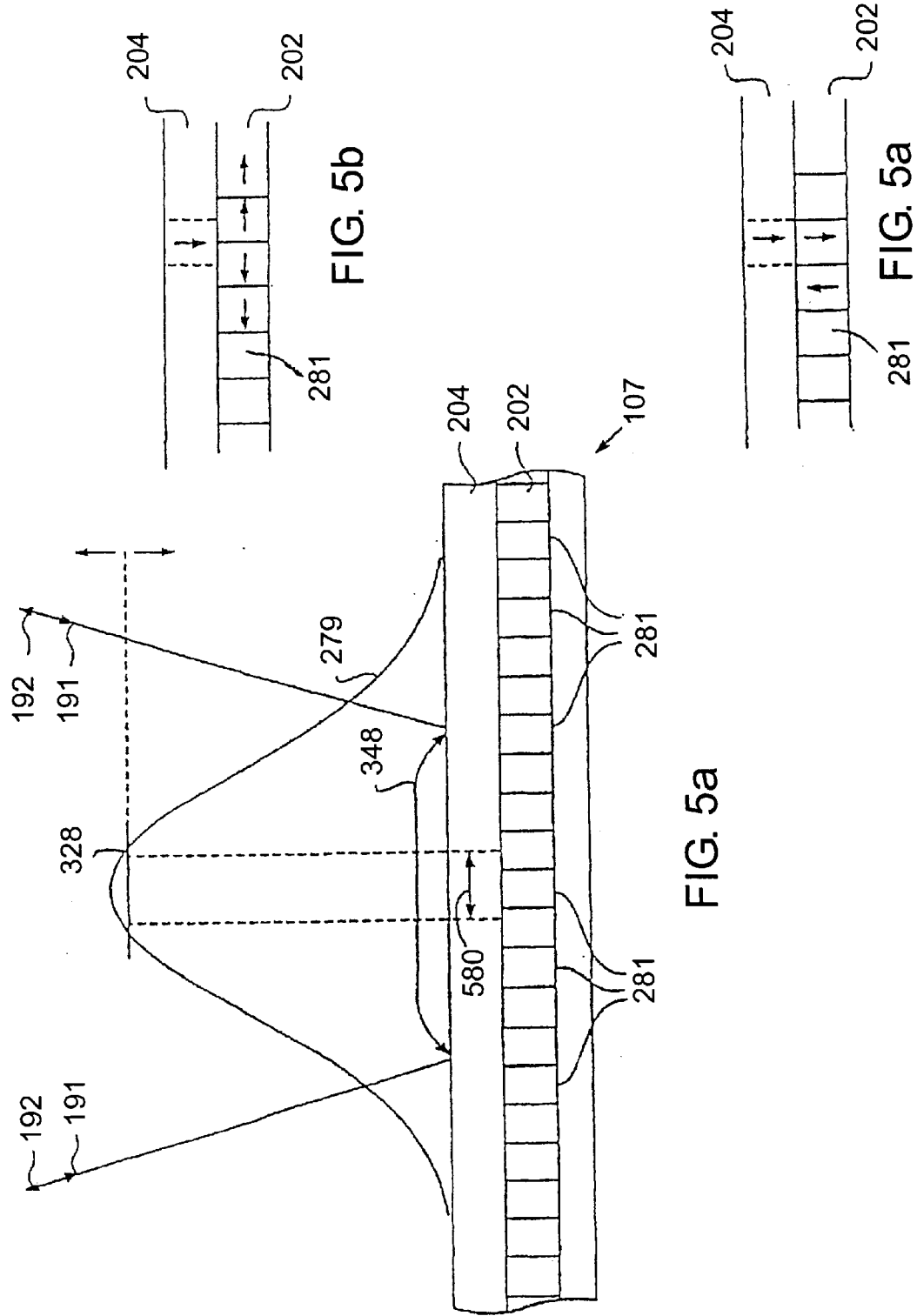

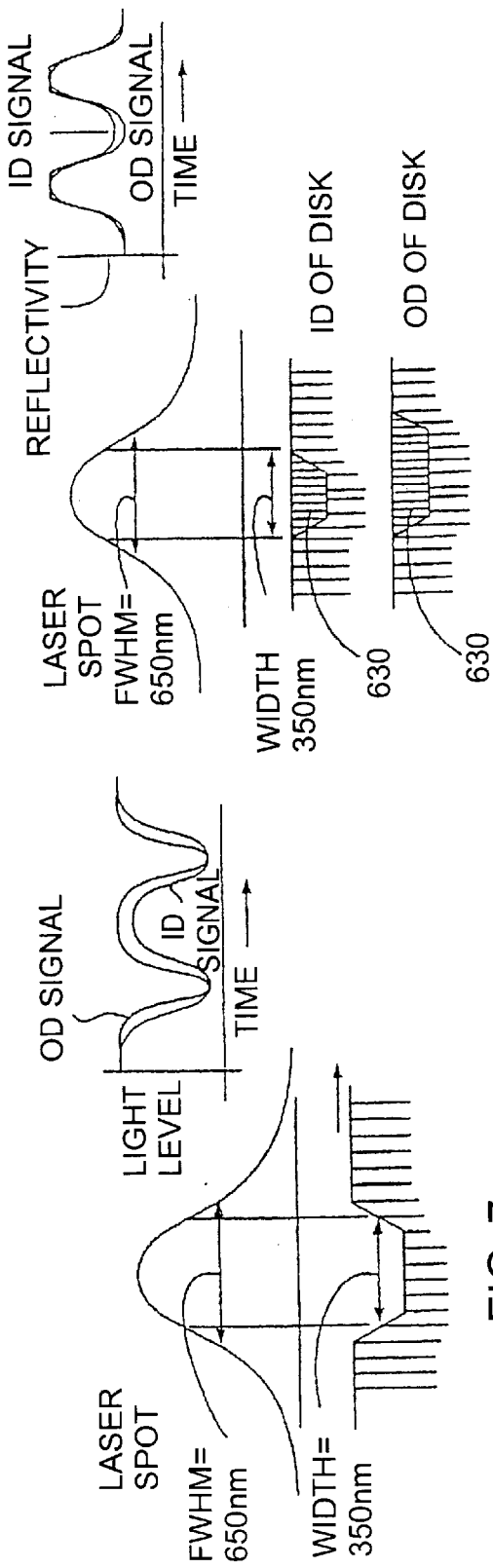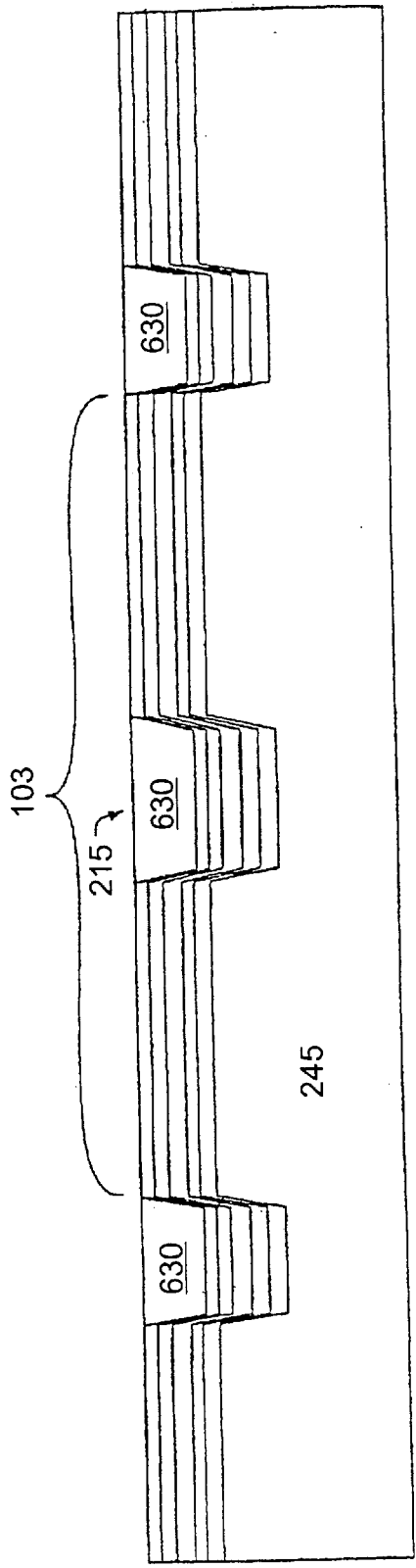

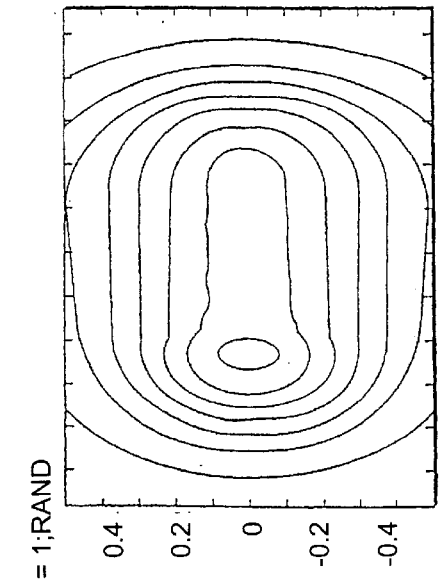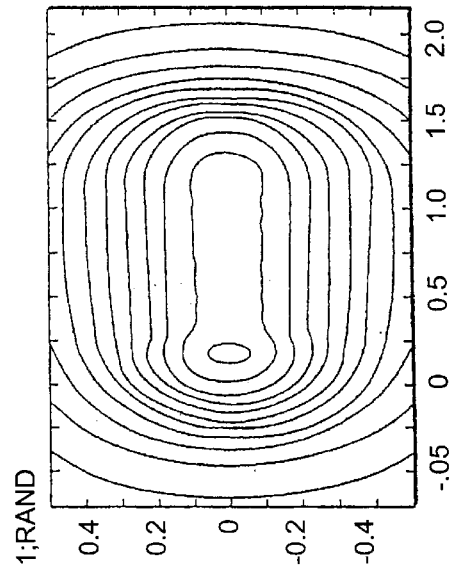
FIG. 8b
FIG. 8c

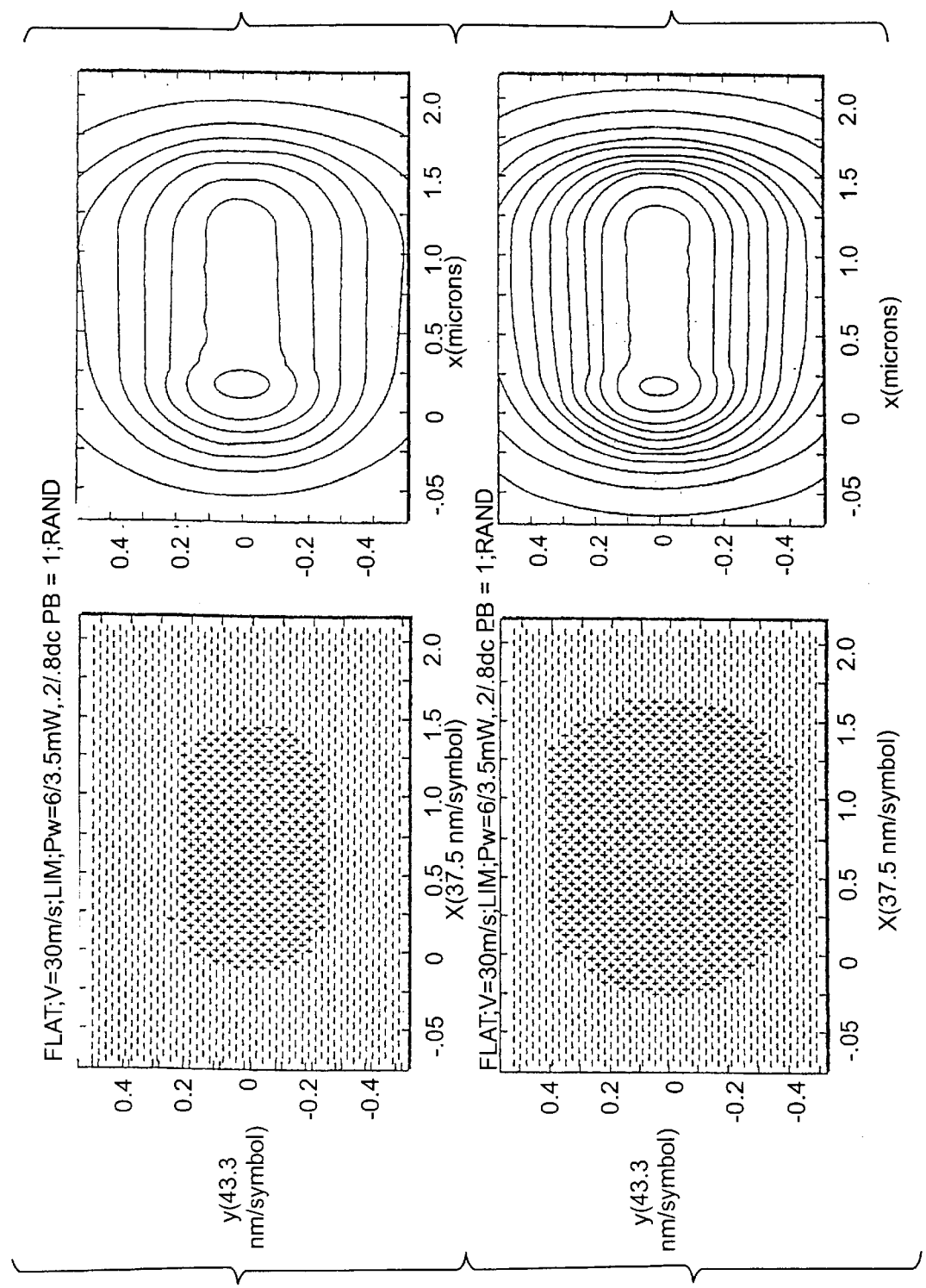

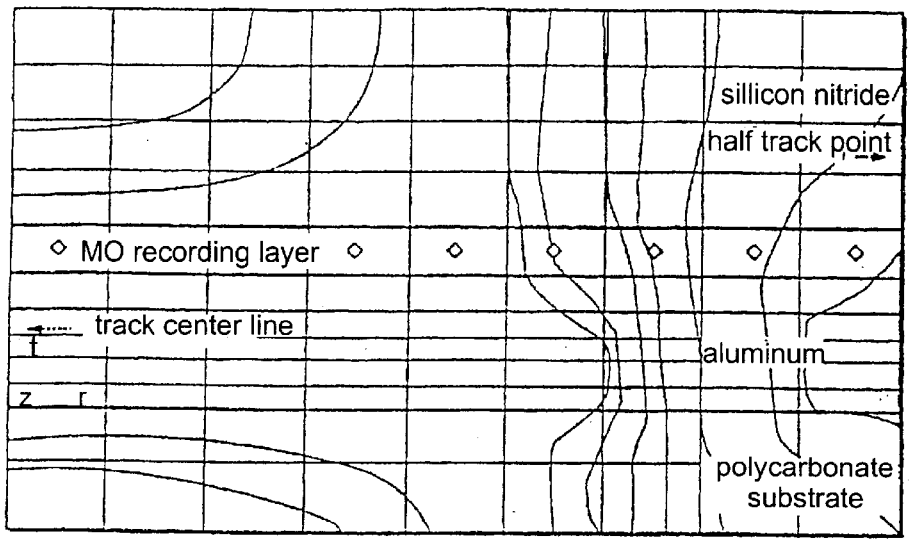
GROOVED MEDIA TEMPERATURE PROFILE AFTER 90 NS
1.7 DEGREES (TOP RIGHT) IN 0.2 DEGREE STEPS    FIG. 9f
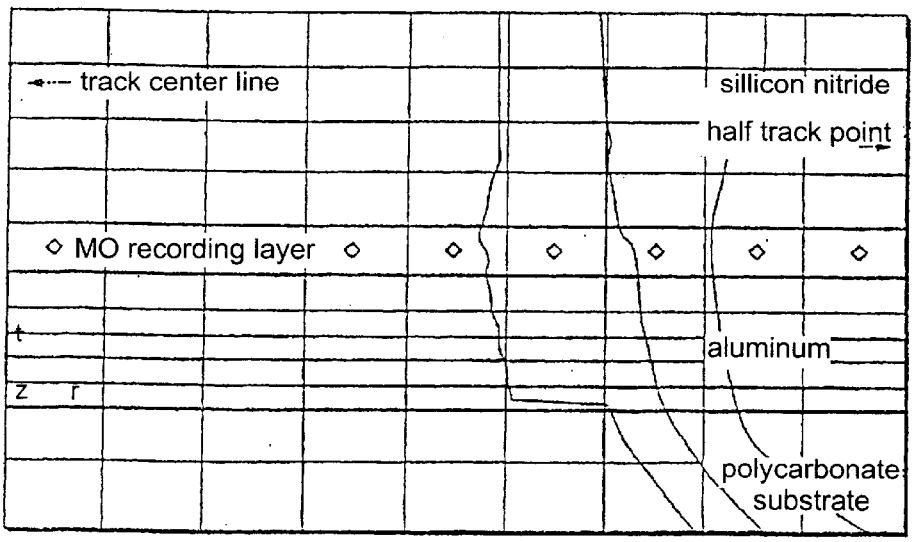
GROOVED MEDIA TEMPERATURE PROFILE AFTER 60 NS
3.0 DEGREES (TOP RIGHT) IN 0.35 DEGREE STEPS    FIG. 9g FLAT MEDIA TEMPERATURE PROFILE AFTER 60 NS
1.5 DEGREES (TOP RIGHT) IN 0.1 DEGREE STEPS GROOVED MEDIA TEMPERATURE PROFILE AFTER 60 NS
3.0 DEGREES (TOP RIGHT) IN 0.35 DEGREE STEPS

STORAGE DISK COMPRISING DEPRESSIONS AND /OR RAISED FEATURES

CROSS REFERENCE TO RELATED APPLICATIONS

This application claims priority from and is a continuation-in-part of U.S. application Ser. No. 09/152,356, filed Sep. 14, 1998, now U.S. Pat. No. 6,264,848 issued Jul. 24, 2001 which is incorporated herein by reference; and this application claims priority from Provisional Application No. 60/081,253, filed Apr. 9, 1998, which is incorporated herein by reference; and this application claims priority from Provisional Application No. 60/115,094, filed Jan. 7, 1999, which is incorporated herein by reference; and this application claims priority from Provisional Application No. 60/115,771, filed Jan. 13, 1999, which is incorporated herein by reference; and this application claims priority from Provisional Application No. 60/082,077, filed Apr. 17, 1998, which is incorporated herein by reference; and this application claims priority from Provisional Application No. 60/111,099, filed Dec. 4, 1998, which is incorporated herein by reference; and this application claims priority from Provisional Application No. 60/113,059, filed Dec. 21, 1998, which is incorporated herein by reference.

FIELD OF THE INVENTION

The present invention relates generally to storage media and more particularly to storage media that utilizes depressions and/or raised features.

BACKGROUND

Data storage on a rotating storage media requires position sensing information to be included on a part of the media surface so that a data can be accurately accessed using the media. Prior art devices have traditionally used different methods to encode and store this position sensing information.

Traditional Winchester magnetic storage systems use magnetic signals recorded in the thin film media surface for this purpose. The position sensing information is typically recorded by the same systems used to write data to that surface in a process known as servo writing. The position sensing information is recorded on the media by an external servo writer to provide track identification and position, which is then used during the writing and reading process to accurately position a flying head during these operations. Typically the data is arranged in a concentric series of tracks, each track being made up of a number of sectors, which each in turn contain multiple bits of binary data. Since the position sensing information is recorded on each recording surface of the storage media one disk at a time, the time required to complete the servo writing process increases as the total number of disks, sectors and tracks increases.

In optical data storage systems using optical disks, for example, CDs and the like, diffraction information obtained from light reflected from disks may be used to provide the position sensing information.

In other optical data storage systems embossing processes may be used. Here the servo sector information maybe written using optical lithographic systems. A series of pits may formed and replicated onto a surface of a metal mold. Numerous plastic disks with accurate copies of this pattern may be produced by injection molding processes. Since the molding operation is fast and low-cost, the complete servo information is provided on the entire disk surface with this inexpensive process, making writing of individual sector information on the disk unnecessary.

In such optical systems the pits are typically required to have very tight dimensional tolerances to perform adequately in their intended use. For example, the depth of the pits should be controlled to a specific fraction of the wavelength of light used, for example, ¼ wavelength of 650 nm light. The observed servo signal is caused by destructive interference that occurs between light reflected off the pits, so that changes in the pit depth result in changes in the magnitude of the reflected optical signal. Since interference is used to generate the signal, significant lateral changes in the size of the spot can cause the adjacent pit edges to effectively overlap, reducing the magnitude and distorting the shape of the servo signal. Thus, accumulation of contaminants in the pits can act to reduce the amplitude of the reflected signal. Also, the presence of pits can act to reduce the smoothness of the disk and thus can cause head flyability problems for heads that are intended to fly near the surface of the media surface.

Magnetic and optical technologies can be combined whereby the optics are used to transmit light to provide thermally assisted recording and reading of data on a storage disk. In this type of magnetic-optical system pits may also be provided for servo tracking in the manner described above. However, the application of the light to the storage disk can cause undesired heating effects in the storage disk.

What is needed, therefore, is a method and apparatus that acts to reduce the undesired effects of pits and heating in a magnetic-storage drive of the prior art.

SUMMARY OF THE INVENTION

The present invention provides for the enhancement of the storage capacity of a data disk drive while reducing optical path optics, electronics and/or the mass and complexity of associated read/write heads. The system utilizes light transmitted by optical elements to servo track a data disk and to heat the data disk during writing and reading of data, and inductive and magnetic elements for actual writing and reading.

The data storage disk may include depressions and/or raised features, which may be filled and/or polished with various materials. In this way, a smooth surface is provided for the read/write head that is aerodynamically maintained in a flying condition very close to the data disk surface. By providing a smooth surface, accumulation of contaminants may be reduced or eliminated. The filler material may be made to be reflective such that an optical signal reflected from the depressions and/or raised features can be provided with a larger amplitude. The reflection of the light from the material used for filling the depression and/or raised feature may be used for sector identification and track following. Additionally, the depressions and/or raised features may be made to present a reflective area that is proportional to the radius of the data disk at which they are disposed. Consequently, the frequency content and/or amplitude variations of the reflected optical signal may be minimized over a radius of the data disk.

In the present invention, the data storage disk may further comprise a set of channels and/or mesas disposed in-between data tracks comprising the data storage disk. The channels and/or mesas may be used to thermally channel and direct the thermal effects of the light applied to the data disk such that the shape of data domain marks that are used to store data along the data tracks may be confined in a cross track direction and defined to more accurately match a preferred rectangular or square geometry. The storage density and SNR may consequently be increased. The channels and/or mesas may be also be filled with a filler material.

One element of this invention is the use of a differential removal process such as chemical mechanical polishing C. M. P., which is a process primarily used in the integrated circuit industry to control planarity of deposited and patterned layers. The deposited layers used to form insulating and conductive regions in the integrated circuits are generally conformal, in the sense that their as-deposited thickness is constant regardless of the topology of the underlying regions.

As multiple layers are deposited, patterned and etched, it becomes increasingly difficult to correctly perform the lithographic steps of surfaces that are no longer smooth and flat. In the present invention, polishing steps are incorporated after deposition steps to return a disk surface to being flat and smooth, after which the record lithographic steps can be performed with sufficient accuracy. Both equipment and processes have been developed to polish various layers in the presence of other layers such that there is a large selectivity on the removal rate between different layers. The layers with the lower polishing rate for so-called etch stops (actually polish stops), which prevent further polishing after the lower polishing rate material is exposed.

The invention includes the formation of a master pattern of depressions or raised features and the subsequent transfer of that pattern to a disk substrate. On top of that substrate, at least one sacrificial layer is provided atop a relatively hard layer. By sacrificial layer it is meant that the layer is relatively easy to etch or otherwise remove in a controlled, planar step. By a hard layer, it is meant that the layer is relatively polish or etch resistant. A data storage layer may serve as this hard layer.

For example, in a magneto optical design, the recording stack may be provided with both silicon nitride and silicon dioxide top layers, with the silicon dioxide layer acting as a sacrificial layer to ensure that the hard layer, of silicon nitride, remains at the end of the process. In a further alternative, a layer of aluminum or aluminum alloy may be deposited, with the aluminum plugs filling the depressions or raised features (created by the embossed servo information) to a level higher than any of the adjacent layers of silicon dioxide, silicon nitride, or similar that dielectric layer. Since the polishing rate of the aluminum can be far faster than that of the silicon dioxide, then the aluminum can be etched or otherwise removed down to a level equal to or slightly below a planar surface with the silicon dioxide, with the silicon dioxide layer allowing for some small level of over polishing. Thus, the silicon nitride layer is preferably protected; the silicon dioxide layer partially remains and is partially removed; and the aluminum metal which fills the pits rises only to a level substantially equal the very flat top surface of the silicon dioxide.

Alternative filler materials may be used in a similar process as long as an appropriate selective removal process is available with sufficient selectivity. In this example, the aluminum functions as a sacrificial layer; the silicon back side is effectively served as a hard layer, and it is removed more slowly. In an alternative embodiment, the silicon dioxide layer could be omitted, with the silicon nitride layer now being the hard layer. For conventional magnetic recording disks, the depressions or raised features may be filled with a non-magnetic material such as aluminum, glass or polymer, such as polyamide, or a magnetic material of higher or lower permeability, coercivity, or susceptibility and polished smooth. Such fill material again is selected on the basis of its removable selectivity relative to the basic hard material of the magnetic recording disk.

The present invention may comprise a storage disk, the storage disk comprising a substrate, the substrate comprising a top surface and a bottom surface, the top surface and the bottom surface defined by raised surface portions and depressed surface portions, the raised surface portions of the top surface and the raised surface portions of the bottom surface disposed along planes that are substantially in parallel opposition to each, and the depressed surface portions disposed between the planes; at least one layered first material, the at least one layered first material comprising a top surface and a bottom surface, the bottom surface of the at least one layered first material disposed above the raised surface portions and above the depressed surface portions, and the top surface of the at least one layered first material disposed to extend above the raised surface portions and above the depressed surface portions; a layered second material; the layered second material comprising a top surface and a bottom surface, the bottom surface of the layered second material disposed above the top surface of the at least one layered first material and above the depressed surface portions, and the top surface of the layered second material disposed above the raised surface portions and above the depressed surface portions; and a layered third material, the layered third material comprising a top surface and a bottom surface, the bottom surface of the layered third material disposed above the top surface of the layered second material and above the depressed surface portions, and the top surface of the layered third material disposed at a level of the top surface of the layered second material. The layered third material may comprise a metal material, a polymer material, or transparent material. In the present invention the storage disk preferably comprises a topmost surface and a bottom most surface, wherein the topmost surface and bottommost surface are substantially flat over their entire surfaces. The at least one layered first material may comprise a storage layer and a readout layer. The at least one layered first material may comprise a magnetic material. The raised surface portions and the depressed surface portions may comprise a servo pattern. The storage disk may comprise a plurality of data tracks, wherein the raised features comprise mesas or channels, and wherein the mesas or channels are disposed between the plurality data tracks.

The present invention may comprise a disk drive, including a disk substrate, the disk substrate comprising a surface, the surface comprising raised features and depressed features, the raised features comprising a topmost level; and a filler material, wherein the filler material is disposed in the depressed features to a level substantially equal to the topmost level of the raised features. The disk drive may further comprise a source of light, wherein the light is directed along an optical path between the source and the disk substrate based on a reflection of the light from the substrate. The raised and depressed features may comprise a servo pattern, wherein the light is reflected from the servo pattern. The disk drive may further comprise a storage layer and a source of light, wherein the light is directed along an optical path between the source and the disk substrate to heat the storage layer.

The present invention may comprise a storage disk, including a disk substrate, the disk substrate comprising a surface, the surface comprising a plurality of servo features, the servo features comprising a dimension that is proportional to a radius of the disk substrate at which the servo features are disposed.

The present invention may comprise a method of utilizing a storage disk that comprises raised and depressed features, including the steps of defining the raised and depressed features in a substrate; depositing an etch stop layer over a surface of the substrate comprising the raised features and the depressed features; depositing a filler material over the etch stop layer to a depth sufficient that the depressed feature is filled to a height substantially equal or above the etch stop layer; and differentially removing the filler material so that the filler material over the etch stop layer is removed with little or no removal of the etch stop layer to leave a substantially planar surface comprising the filler material and the etch stop layer. The method may further include the step of depositing a sacrificial layer over the etch stop layer and before depositing the filler material layer; and wherein the etching step substantially etches the filler and the sacrificial layer to leave a substantially planar surface comprising the etch stop layer and the filler material. The etch stop layer may comprise silicon nitride and wherein the sacrificial layer comprises silicon dioxide.

The present invention may comprise a storage disk, including a disk substrate, the disk substrate comprising a surface, the surface comprising raised features and depressed features, the raised features comprising a topmost level; and disk substrate leveling means for leveling the depressed features to a level substantially equal to a topmost level of the raised features.

Other features and advantages of the present invention will become apparent to person of skilled in the art who studies the following invention disclosure. The present invention is not be limited to the specific embodiments disclosed in this application or any equivalent thereof, as the invention, as described, may be used in any of a number ways, known and unknown at this period of time.

BRIEF DESCRIPTION OF THE DRAWINGS

In FIG. 2b, a typical servo sector is seen;

In FIG. 5, views of storage and readout layers of the present invention are seen.

In FIGS. 7a–b, signals derived from a servo pattern is seen;

DETAILED DESCRIPTION

The present invention provides for the enhancement of the storage capacity of a data disk drive while reducing optical path optics, electronics and/or the mass and complexity of associated read/write heads. The system utilizes light transmitted by optical elements to servo track a data disk and to heat the data disk during writing and reading of data, and inductive and magnetic elements for actual writing and reading.

The data storage disk may include depressions and/or raised features, which may be filled and/or polished with various materials. In this way, a smooth surface is provided for the read/write head that is aerodynamically maintained in a flying condition very close to the data disk surface. By providing a smooth surface, accumulation of contaminants may be reduced or eliminated. The filler material may be made to be reflective such that an optical signal reflected from the depressions and/or raised features can be provided with a larger amplitude. The reflection of the light from the material used for filling the depression and/or raised feature may be used for sector identification and track following. Additionally, the depressions and/or raised features may be made to present a reflective area that is proportional to the radius of the data disk at which they are disposed. Consequently, the frequency content and/or amplitude variations of the reflected optical signal may be minimized over a radius of the data disk.

In the present invention, the data storage disk may further comprise a set of channels and/or mesas disposed in-between data tracks comprising the data storage disk. The channels and/or mesas may be used to thermally channel and direct the thermal effects of the light applied to the data disk such that the shape of data domain marks that are used to store data along the data tracks may be confined in a cross track direction and defined to more accurately match a preferred rectangular or square geometry. The storage density and SNR may consequently be increased. The channels and/or mesas may be also be filled with a filler material.

This present invention is not to be limited to the specific embodiments disclosed in this application or any equivalent thereof, as the invention, as described, may be used in any of a number ways, known and unknown at this period of time.

Figure 1:
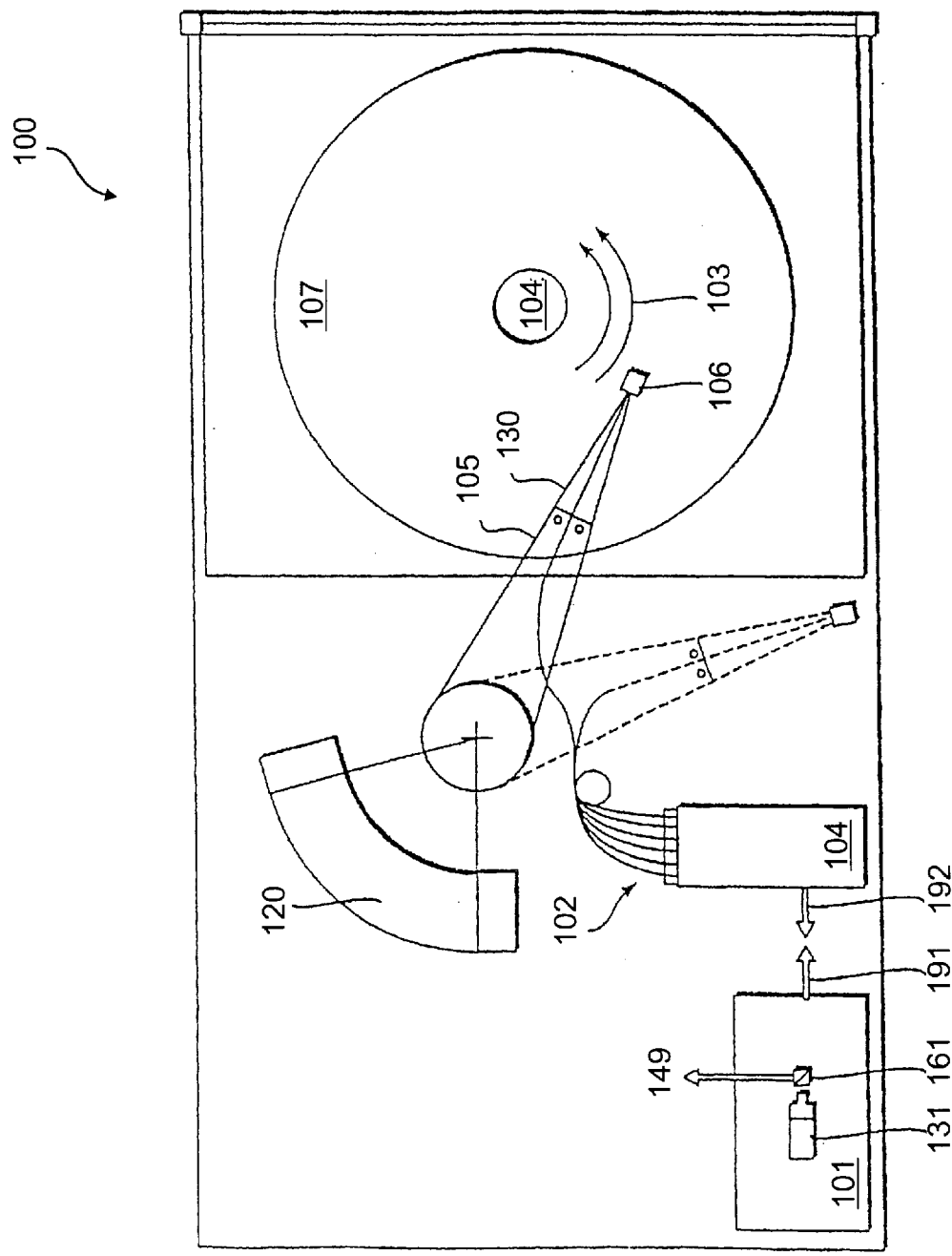
In FIG. 1, basic elements of a data storage system are seen.

Referring now to FIG. 1, basic elements of a data storage system incorporated as part of the present invention are seen. FIG. 1 shows a storage system 100 comprising an actuator assembly 120 which moves a flying read/write head 106 for writing and reading of data to and from a plurality of radially spaced apart concentric and circular data tracks 103 on at least one rotating data storage disk 107.

Figure 2A:
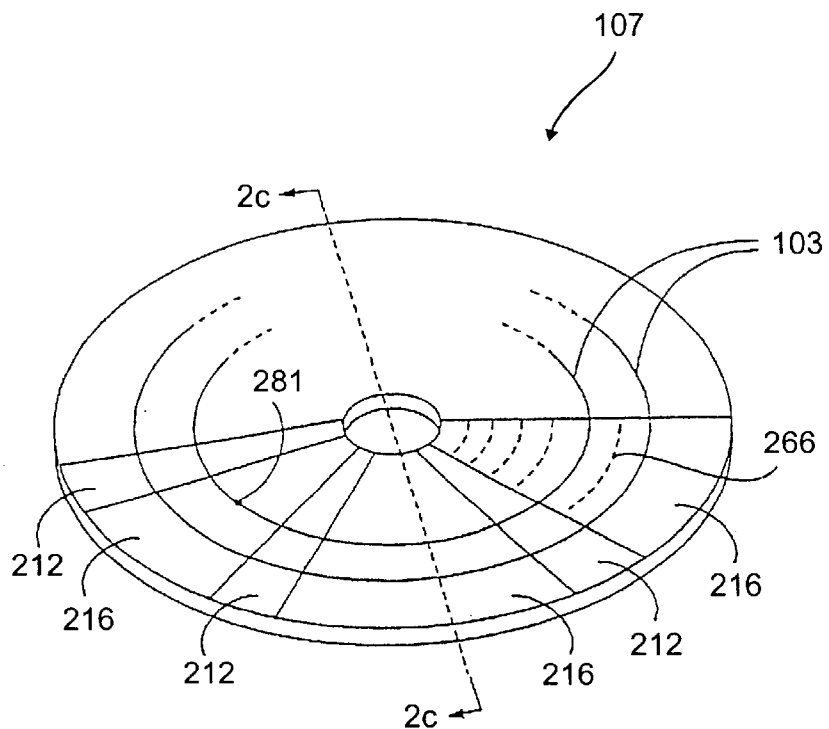
In FIG. 2a, a disk of the present invention is seen in detail.
Figure 2C:
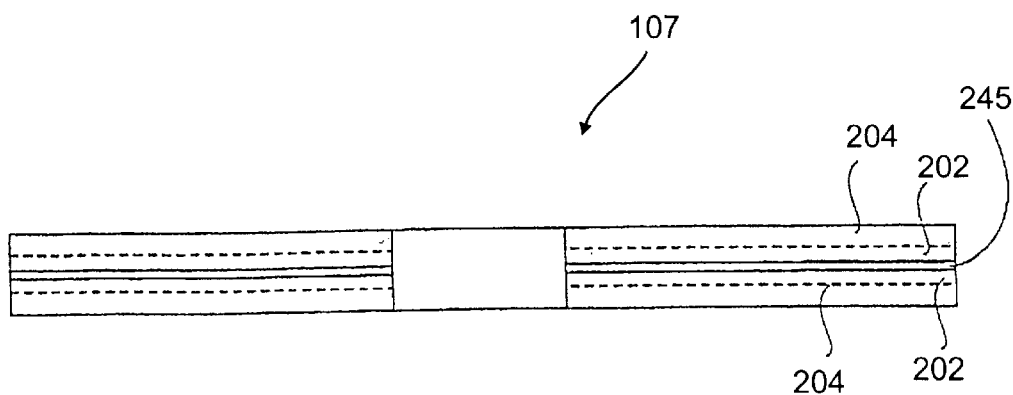
In FIG. 2c, views of storage and readout layers of the present invention are seen.

Referring now to FIG. 2a, a disk of the present invention is seen in further detail. For the purposes of describing an embodiment of the present invention, a particular data architecture of the disk 107 is described.

The disk 107 is circumferentially divided into a plurality of uniformly and circumferentially spaced apart wedge shaped servo sectors 212 extending contiguously outward from a center.

A corresponding plurality of wedge shaped and spaced apart data sectors 216 are interposed circumferentially between and adjacent to each of a respective pair of servo sectors 212. The data sector 216 includes a plurality of data bits (marks) comprised of magnetic domains 281 that are used to store information on the disk 107. The magnetic data domain 281 marks are separated with a constant linear spacing along the data tracks 103. The data tracks 103 are spaced apart radially with a nominal constant radial data track pitch Tp.

Referring now to FIGS. 1 through 4a–f, a data storage system of the present invention will now be described.

FIGS. 1, through 4a–f are provided to show a general structure of an exemplary storage system 100, which comprises optical elements for reading the servo sectors 212, as well as optical, inductive, and magnetic elements for writing and reading data bits to and from the data sectors 216.

As seen in FIG. 1, system 100 includes a set of flying heads 106 that are adapted for use with a set of double sided disks 107. One flying head 106 is provided for each surface of disk 107. The heads 106 are coupled to a rotary actuator magnet and coil assembly 120 by a suspension 130 and actuator arm 105 by which they are positioned over the surfaces of the disks 107. In operation, the disks 107 are rotated by a spindle motor to generate aerodynamic lift forces between the flying heads 106 and the rotating disk 107. The aerodynamic forces maintain each flying head 106 in a flying condition above the surface of each disk 107. The lift forces are opposed by equal and opposite spring forces supplied by the suspensions 130. During nonoperation, each flying head 106 is maintained statically in a storage condition away from the surface of the disk 107, typically on a ramp (not shown) away from the surface of the disk 107.

System 100 further includes a laser optics assembly 101, an optical switch 104, and a set of optical fibers 102. Each set of optical fibers 102 are coupled along a respective one of the set of actuator arm's 105 and suspensions 130 to a respective one of the set of flying heads 106.

The laser optics assembly 101 includes a diode laser source 131 of a type well known in the art. The laser optics assembly 101 directs the outgoing laser beam 191 from the laser source 131 towards an optical switch 104. The laser optics assembly 101 receives the reflected laser beam 192 and processes the signal for output as a signal 149.

Figure 3:
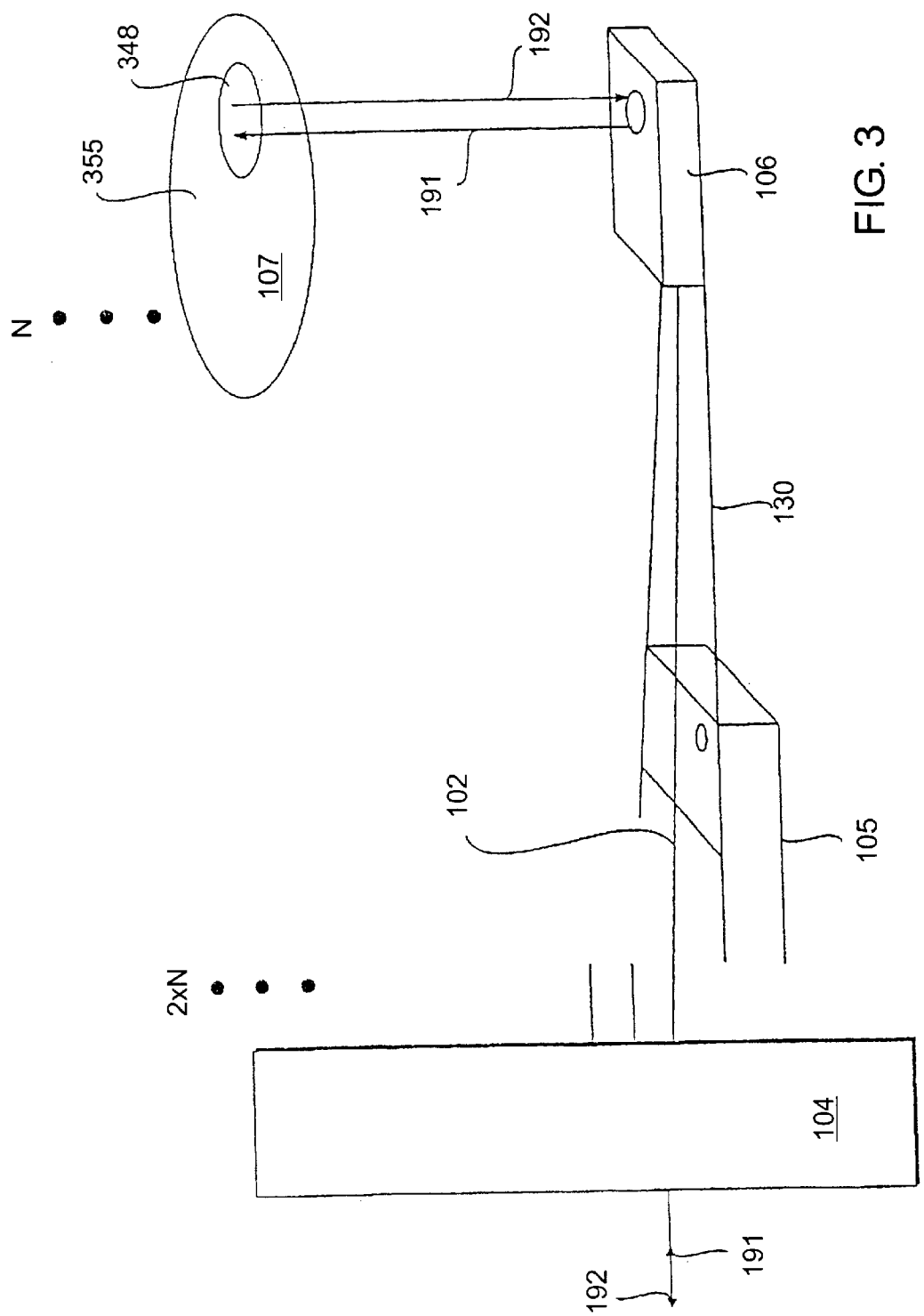
In FIG. 3, a diagram showing a representative optical path is seen.

Referring now to FIG. 3, there is seen a diagram showing a representative optical path of the system 100 in further detail. In the preferred embodiment, the representative optical path includes: the optical switch 104, one of the set of optical fibers 102, and one of the set of flying heads 106. The optical switch 104 provides sufficient degrees of selectivity for directing the outgoing laser beam 191 toward a respective proximal end of a respective optical fiber 102. The outgoing laser beam 191 is directed by the optical fiber 102 to exit a respective distal end so as to pass through the flying head 106 onto a respective disk 107.

The aforementioned optical path is bi-directional in nature. Accordingly, a reflected laser beam 192 is directed through the flying head 106 and towards the distal end of the optical fiber 102. The reflected laser beam 192 propagates along the optical fiber 102 to exit at its proximal end and is selectively routed by the optical switch 104 for transmission to laser-optics assembly 101 for subsequent conversion to a signal representative of the servo information embedded in the servo sectors 212.

Referring now to FIG. 2b, a typical servo sector in seen. In FIG. 2b, there is shown a magnified portion of a typical servo sector 212. The following description will briefly summarize the reasons for providing the outgoing laser beam 191 to selectively access information comprising the servo sectors 212. The servo sectors 212 comprise encoded servo information that includes a coordinate reference system that enable access to data in data sectors 216 of the disk 107. In the preferred embodiment, the data tracks 103 that span each servo sector 212 contain three kinds of encoded information: servo timing marks (STM) 217, data track address marks 232, and fine circumferential position error signal (PES) servo burst marks 252. As described below, the servo sectors 212 may be embossed on a surface of a substrate 245 (FIG. 2c) comprising the disk 107 or otherwise formed to comprise depressions or raised features. Embossing and/or molding the disk 107 is understood to provide manufacturing and cost advantages. The type of materials from which disks may be formed has been well identified and described in a number of published documents as is well known in the art.

In one embodiment, the servo information comprises a combination of raised features and depressed features, with a representative depressed feature referenced as a pit 215. It is understood that in another embodiment, the function provided by the pit 215 could be provided by a raised feature. Furthermore, although, the pits 215 are illustrated as being elongated in shape, it is understood that the pit 215 may comprise other shapes, for example, circular or similar shape. In the preferred embodiment, the pits 215 are written along certain ones of a plurality of master tracks $210m$, $210m+1$, $210m+2$ . . . . The master tracks are concentrically disposed and centered and equally spaced and separated by a track pitch Tp/2, wherein the data tracks 103 comprise alternate ones of the plurality of master tracks.

The servo timing marks comprise a first pattern of pits 215 that are written from the outer diameter to the inner diameter and the certain ones of the master tracks $210m$, $210m+1$, $210m+2$ . . . to form continuous radial lines. The disk drive control system (DDCS) of the disk drive 100 may be configured to recognize the first pattern as marking the start of the servo sector 212 each time the first pattern is detected.

In the preferred embodiment, the data track address marks 232 comprise a second pattern of individual pits 215. The second pattern is decoded by the DDCS and used as address pointers for identification of particular data tracks 103.

In the preferred embodiment, the position error marks 252 comprise a third pattern of individual pits 215. The third pattern comprises four concentrically disposed segments 211, 212, 213, 214. The third pattern is used to derive position error signals for performing position adjustments of the read/write head 106 over a particular data track 103 during track seeking and following as is well known in the art.

Each pit 215 may characterized by three dimensions that are controlled: a radial pit width (erpw), a circumferential pit width (ecpw) and a pit depth (epd). The control and uniformity of pit position, and dimensions establish a basis for the DDCS to compensate for variability of user recorded data by appropriate control algorithms.

The servo sector 212 of the present invention may or may not utilize an automatic gain control field (AGC). Preferably, an AGC field is not used so to minimize the size of the servo sector or equivalently to increase the data storage capacity of the data sectors 216.

In the prior art, diffraction information may be used to maintain a position of a head over a particular data track of a disk. However, in a system that uses optical fibers, diffraction information may be undesirably degraded by the optical properties of the optical fibers. The present invention uses, instead, reflectivity information from the pits 215. The pits 215 destructively interfere with the reflected laser beam 192 such that the beam's amplitude changes in proportion to light reflected from the disk 107. The changes in amplitude are embodied in the reflected laser beam 192 and are summed by well known optical and electrical detection techniques on the laser optics assembly 100 for output as the signal 149. The signal 149 is used as a position error signal (PES) to maintain the position of the head 106 over the disk 107. It is understood, of course, that in a system that does not utilize optical fibers, diffraction information from a data disk could be used for servo tracking and, thus, the present invention would not be limited to pits 215, but could instead comprise the use of diffraction information from other servo tracking features, for example, channels and the like.

Figure 4A:
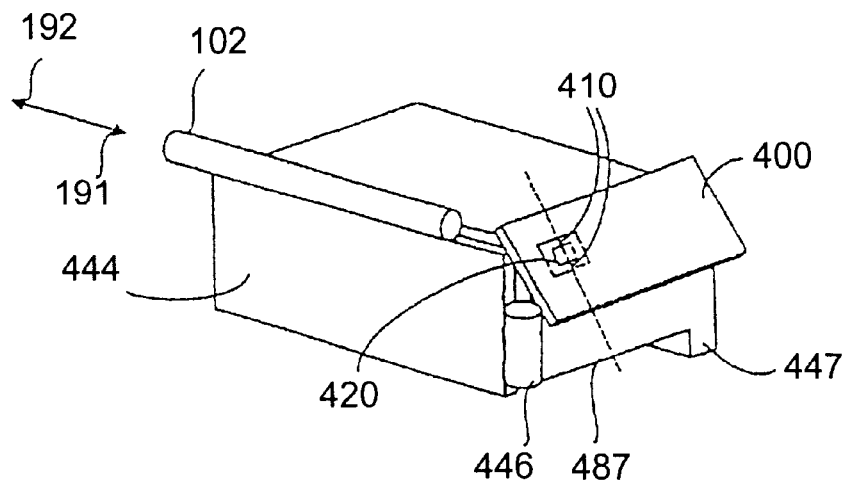
In FIGS. 4a–n, various views a head of the present invention are seen.
Figure 4B:
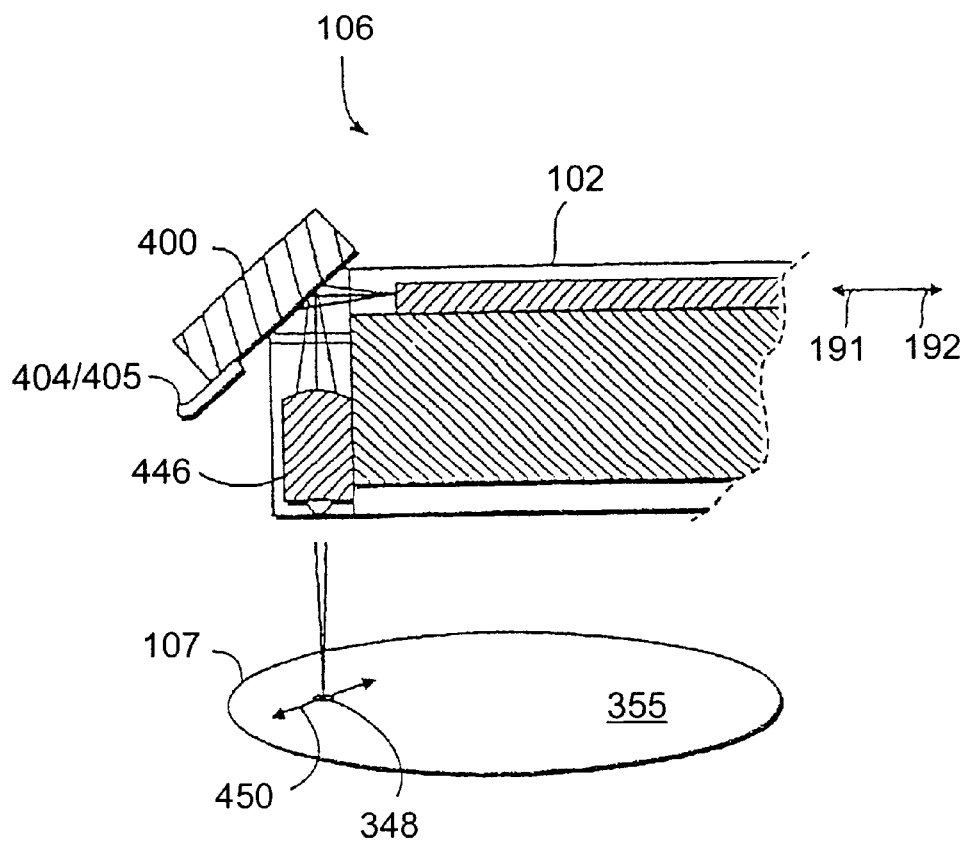
Figure 4I:
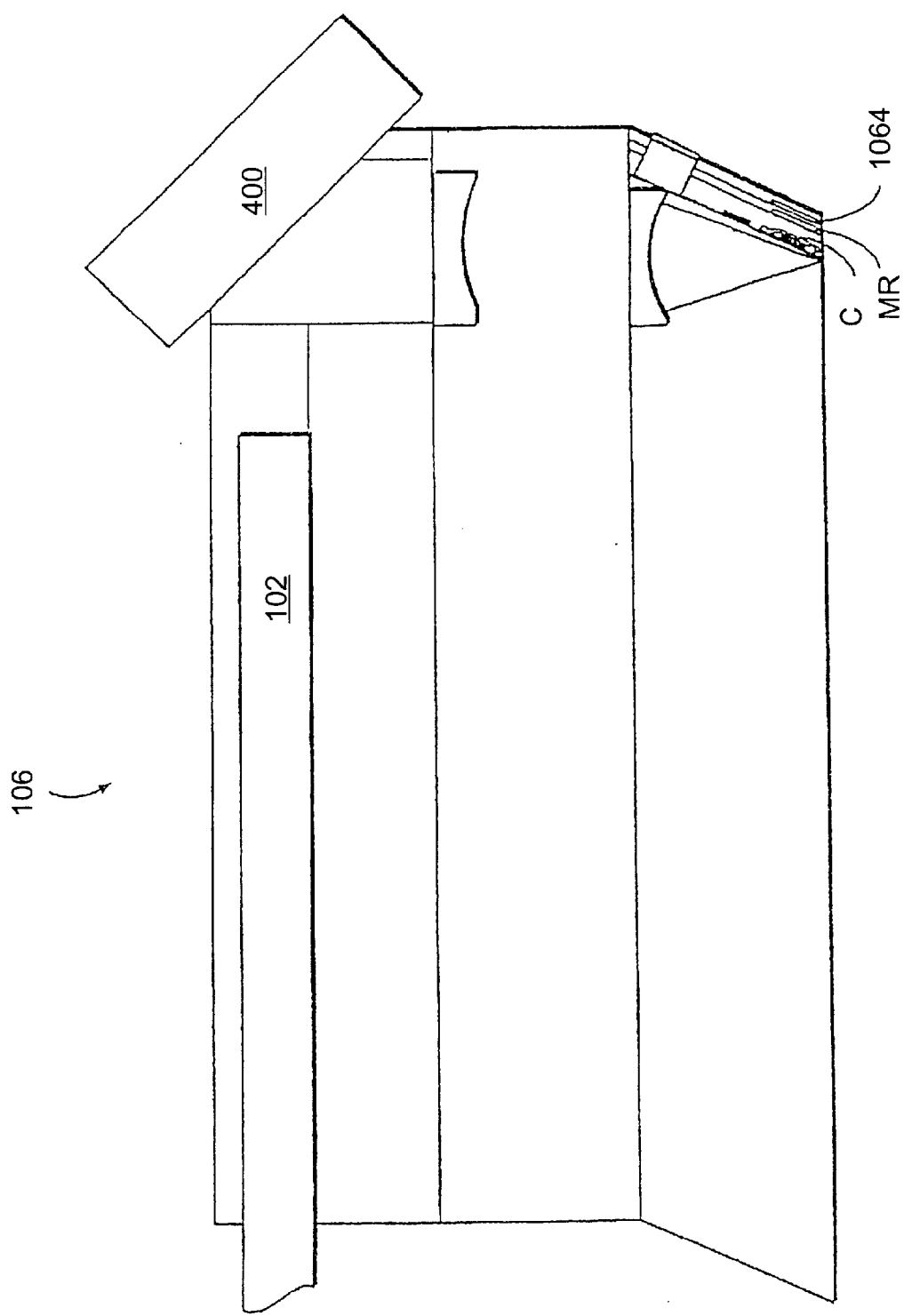
Figure 4J:
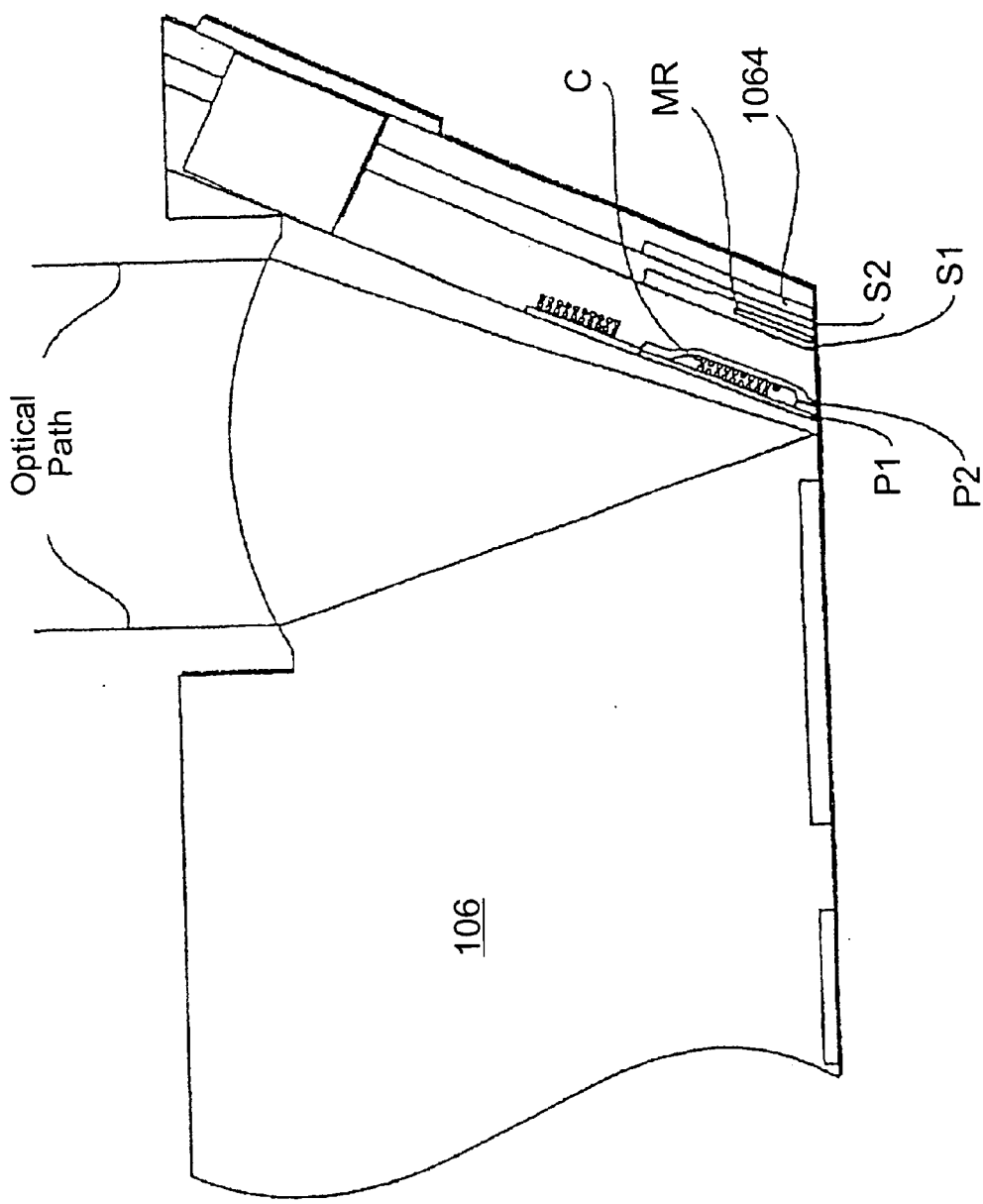
Figure 4K:
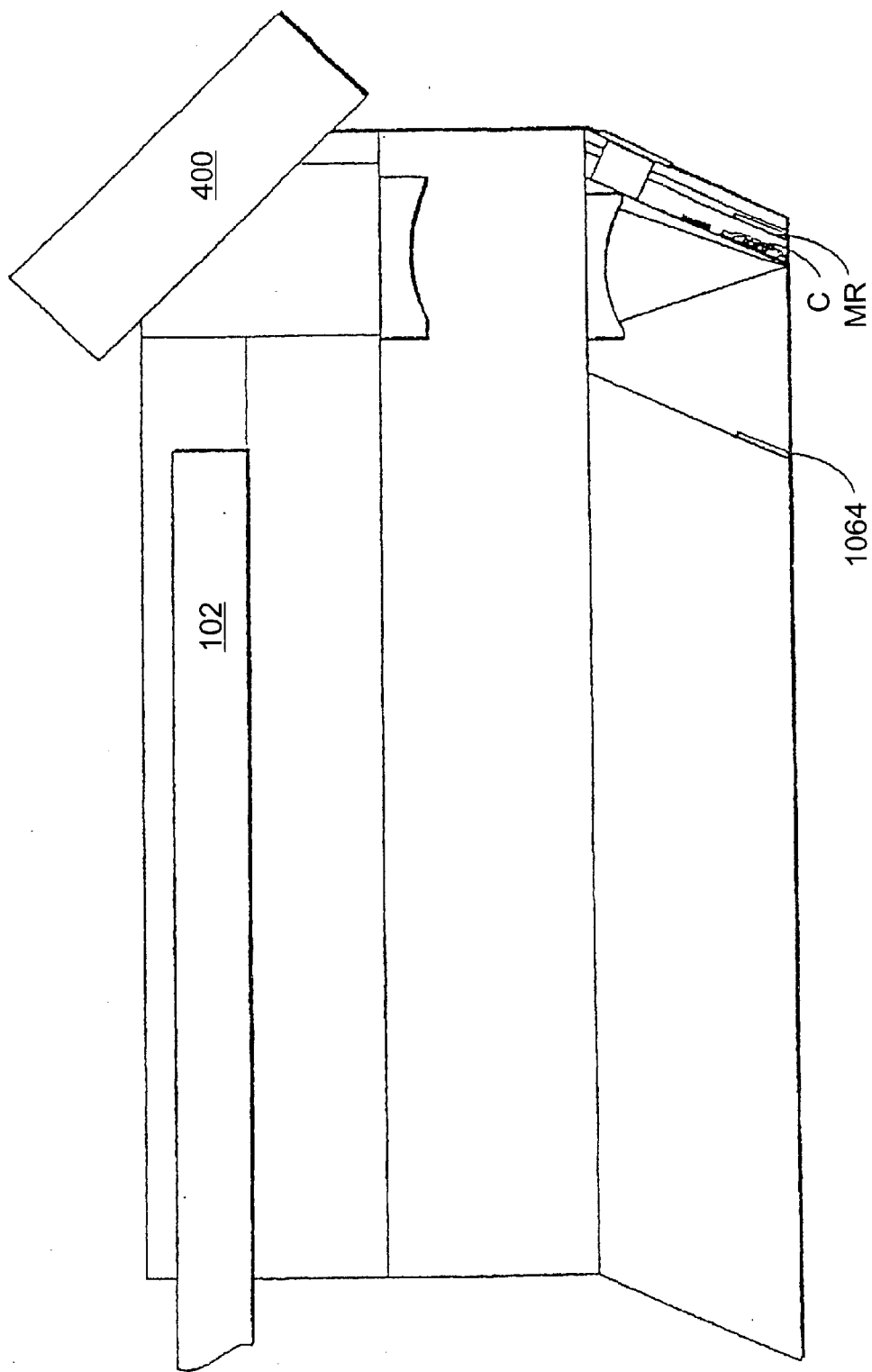
Figure 4I:
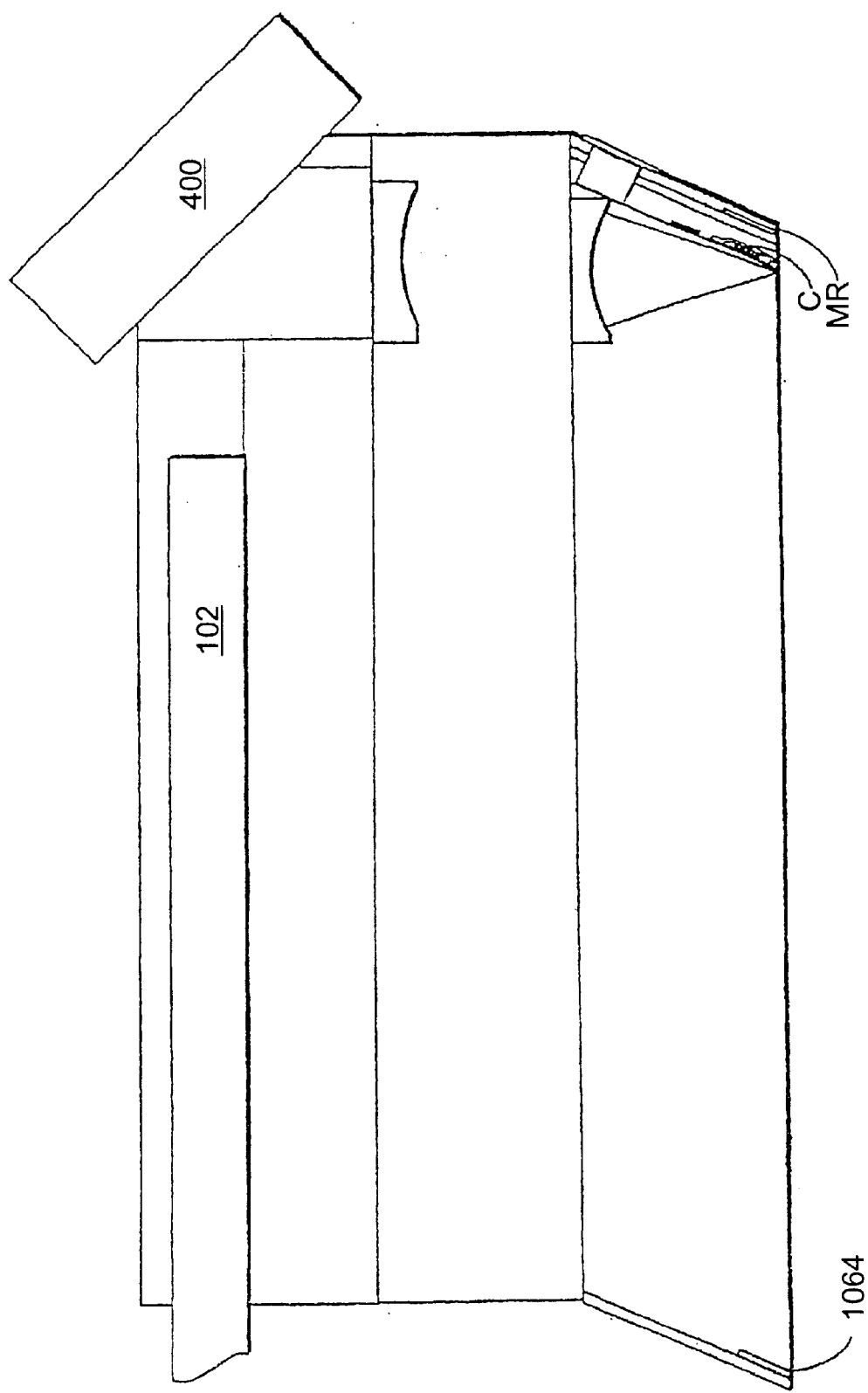
Figure 4N:
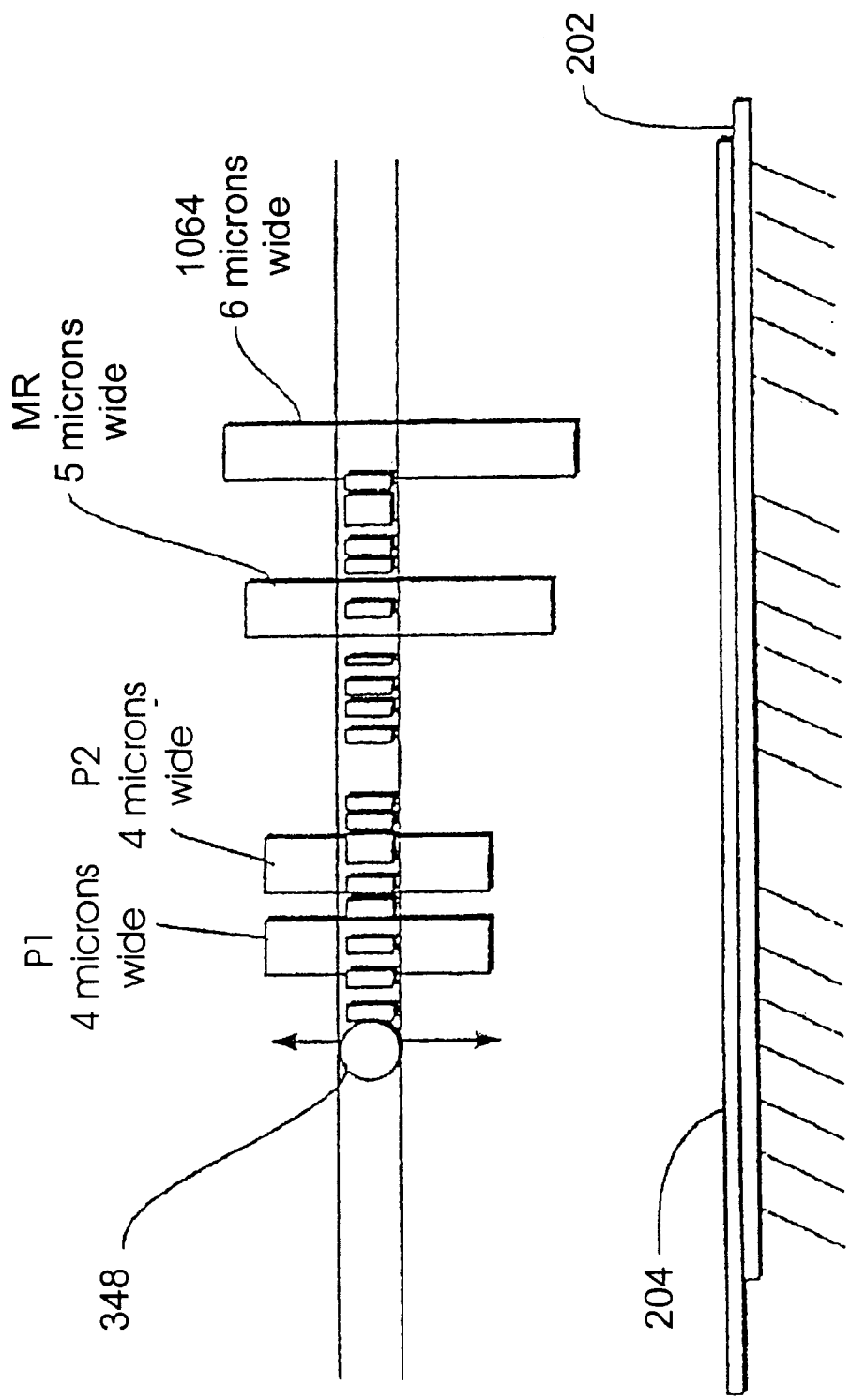

Referring now to FIGS. 4a–n, various views of a head of the present invention are seen. In FIGS. 4a–g the flying head 106 is shown for use above a recording/storage layer 355 of one of the set of disks 107. The flying head 106 includes: a slider body 444, an air bearing surface 447, a reflective substrate 400, and objective optics 446. The slider body 444 is dimensioned to accommodate the working distances between the objective optics 446, the optical fiber 102, and the reflective substrate 400. The reflective substrate 400 may include a reflective surface, which is aligned so as to direct the laser beams 191, 192 to and from the disk 107 and, for example, for fine tracking purposes. In one embodiment, the reflective substrate may comprise a micro-machined mirror as is described in commonly assigned U.S. patent application Ser. No. 08/844,207, entitled "Data Storage System Having An Improved Surface Micro-Machined Mirror," which was filed on Apr. 18, 1997 and which is incorporated herein by reference. In the preferred embodiment, the reflective substrate 400 includes a small (in one embodiment, less than 300 μm square) steerable reflective central mirror portion 420 (illustrated in FIG. 4a by dashed lines representative of the reflective central mirror portion on a side of the steerable micro-machined mirror assembly opposite to that which is visible). The small size and mass of the micro-machined mirror contributes to the ability to design the flying head 106 with a low mass and a low profile. As used in the present invention, fine tracking and short seeks to a series of nearby tracks may be performed by rotating the steerable reflective central mirror portion 420 about a rotation axis so that the propagation angle of the outgoing laser beam 191 and the reflected laser beam 192 is changed before transmission to the objective optics 446. As cross track data track densities increase, it is understood that a hi-bandwidth low mass means of fine tracking, as provided by the micro-machined mirror, would be useful. A low mass hi-bandwidth mirror The reflective central mirror portion 420 is rotated by applying a differential voltage to a set of drive electrodes 404, 405. The differential voltage on the electrodes creates an electrostatic force that rotates the reflective central mirror portion 420 about a set of axial hinges 410 to move the focused optical spot 348 in a radial direction 450 of the disk 107. In an exemplary embodiment, a rotation of approximately ±2 degrees (equivalent to approximately ±4 tracks) of the steerable reflective central mirror portion 420 is used for movement of the focused optical spot 348 for storage and reading of information, track following, and seeks from one data track to another data track. In other embodiments, other ranges of rotation of the steerable reflective central mirror portion 420 are possible. Coarse tracking may be maintained by adjusting a current to the rotary actuator magnet and coil assembly 120 (FIG. 1). In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, in one embodiment of the present invention, irrespective of the movement of the set of actuator arms 105 and set of suspensions 130, a set of the steerable micro-machine mirror assemblies of the present invention may be used to operate independently and thus permit track following and seeks so as to read and/or write information using more than one disk surface at any given time. Independent track following and seeks using a set of concurrently operating steerable micromachined assemblies 400 would preferably require a set of separate respective fine tracking and mirror driving electronics.

Although slider body 444 may include industry standard "mini", "nano", or "pico" sliders, alternatively dimensioned slider bodies 444 may also be used.

The optical fiber 102 is coupled to the slider body 444 along an axial cutout 443, and the objective optics 446 is coupled to the slider body 444 along a vertical corner cutout 411. The cutouts 443 and 411 may be designed as channels, v-grooves, or any other suitable alignment features, or means for coupling and aligning the optical fiber 102 and objective optics 446 to the flying head 106. The laser beams 191 and 192 traverse an optical path (to and from the disk 107) that includes: the fiber 102, the reflective substrate 400, and the objective optics 446. The optical fiber 102 and the objective optics 446 are positioned to focus of the outgoing laser beam 191 within the spot of interest as a focused optical spot 348. The optical fiber 102 and the objective optics 446 may be subsequently secured in place by using ultraviolet curing epoxy or similar adhesive. Although the optical elements comprising the optical fiber 102, the objective optics 446, and the reflective substrate 400 are illustrated to be aligned along an optical path offset from a longitudinal central axis of the flying head 106, it is understood that in other embodiments these optical elements could be aligned along some other optical path, for instance, along the longitudinal central axis, as illustrated in FIG. 4g.

Referring now to FIGS. 4h–n, additional elements comprising the head of the present invention are seen in a top and side cross-section. In a preferred embodiment of the present invention, the flying head 106 may further include a conductor-C element, a shield-S1 element, a shield element-S2, and magnetic elements, including: a permalloy pole piece-P1, a permalloy pole piece-P2, a magnetoresistive element MR, and a pre/erase magnet 1064. In the preferred embodiment, the element MR comprises a class of magneto resistive elements which may be made to provide more sensitivity than conventional magneto-resistive elements and that is capable of reading more narrow data domains marks, and thus, narrow data track pitches, for example, a Giant Magnetoresistive (GMR) element. GMR head technology, is well known in the art and is described in, for example, "Giant Magnetoresistance: A Primer" by Robert White, IEEE Transactions on Magnetics, Vol. 28, No 5, September 1992, incorporated herein by reference. Although in an exemplary embodiment the element MR comprises GMR technology, it is understood that the present invention is not to be limited by this embodiment as other types of elements are within the scope of the present invention, for example, Spin Valve elements and the like.

In the preferred embodiment, data is written by directing magnetic flux generated by conductor C using the magnetic pole pieces P1, P2, and read using elements S1, MR, S2. In an exemplary embodiment, the elements comprise a 1 um thickness suitably positioned so as to extend over a lateral temperature profile 279 formed in a recording/storage layer 355 by the spot 348 and a 8 μm width to allow for reading and writing by the elements as the optical spot 348 is scanned back and forth by the reflective substrate 400.

In achieving the reading of narrow data track pitches the present invention addresses a number of problems. A first problem is that when data tracks are placed close together, a very high servo tracking error rejection should be implemented for data tracking; for example, a track pitch of 1 µm may require a cross-over frequency of greater than 2 kHz. In the present invention, this concern is addressed by utilizing the fine tracking capabilities of the micro-machined mirror, which was described in an embodiment of the reflective substrate 400 above, such that high speed fine tracking can be achieved with an improvement on the order of at least 10× over the prior art. Secondly, the writing of the radial and circumferential position servo patterns (servo writing) requires accurate placement despite disk flutter and spindle bearing non-repeatable runout. One can expect a servo writing accuracy of about 0.2 µm with 0.8 mm thick 3.5-inch disks. In the present invention, this concern is addressed with reference to the description of the pits 215 above, such that near perfect patterns of servo patterns may be achieved with accuracy down to at least 5 nm.

A third problem is that writing of data may cause side-erasure of data tracks on the order of about 0.3 µm. Side erasure is preferred for proper operation of the record/playback process to eliminate old information. However, the side erasure scales within the gap width of the write elements, and the gap width is determined by the desired magnetic data domain density, which is preferably as high as possible.

Finally, head design presents problems associated with tolerancing. The photolithographic tolerance in manufacturing magnetic head elements is about ten percent of the thickness of the elements. If the head elements are about 4 µm thick; the tolerances would be about 0.4 µm.

The last two problems from above are addressed by the present invention as described below.

Referring now to FIGS. 5*a*–*c*, views of storage and readout layers of the present invention are seen. The following description summarizes how the outgoing laser beam 191 is used to selectively access information from the data tracks 103 comprising the data sectors 216 of the disk 107.

In the preferred embodiment, the disk 107 comprises a class of media that includes at least two magnetic layers that interact, including a storage layer 202 and a readout layer 204. An exemplary media may comprise a magneto-static media or an exchange coupled media. The storage layer 202 is preferably of a high coercivity material that supports a desired data bit density. An advantage of a high coercivity storage layer is that it has potential for overcoming the superparamagnetic limit (i.e., the tendency of adjacent domains to demagnetize each other). The coercivity is preferably high enough that the magnetic domain marks in the storage layer 202 cannot be written to at temperatures below 65 C. However, by heating the storage layer 202 with the outgoing laser beam 191, the coercivity of the storage layer 202 is preferably lowered enough such that bits can be written to a storage location comprising magnetic domains (hereinafter referred to as a data domain mark/s 281), in the storage layer 202 by the elements P1, P2, C. It is understood that in an embodiment in which the storage layer 202 exhibits a horizontal anisotropy (e.g. CoCr), the P1, P2, C elements will orient the data domain marks 281 longitudinally with an in plane orientation (FIG. 5*b*), whereas in an embodiment in which the storage layer 202 comprises a material that exhibits a vertical anisotropy (e.g. TbFeCo) the data domain marks 281 will be oriented vertically with an out of plane orientation (FIG. 5*c*).

In the preferred embodiment, the readout layer 204 may comprise a class of media that exhibits a temperature dependence that is a function of its magnetocrystalline anisotropy. The layer 204 is also responsive to heat; however, the readout layer 204 is responsive in a different way than the storage layer 202.

In one embodiment, the readout layer 204, is magnetized such that flux emanating from the data domain marks 281 in the underlying storage layer 202 cannot be read when not heated, for example, as described by K. Aratani, et al, Proc SPIE 1499, 209 (1991), which is incorporated herein by reference. In this embodiment, to read the data domain marks 281, the readout layer 204 is heated by the outgoing laser beam 191 to a lower temperature than the storage layer 202 is heated for writing. In doing so, a temperature profile 279 is formed in the readout layer 204 by the outgoing laser beam 191 as the disk 107 rotates. In this embodiment, a particular temperature along the temperature profile 279 creates an aperture 580 in the readout layer 204, wherethrough flux emanating from the data domain marks 281 beneath the aperture is coupled to vertically align a region of magnetic domains in readout layer 204 above such that the magnetic domain marks in the readout layer 204 can subsequently be detected by head 106 elements S1, MR, S2. The thermal time constant of the readout layer 204 should preferably be long so that the heat generated by the optical spot 348 will not dissipate by the time the head elements MR, S1, S2 pass over the spot. In this embodiment, the flux from the data domain marks 281 is understood to be accessible only during the time at which the outgoing laser beam 191 is applied to form the aperture. Preferably, the aperture will be preferably smaller the spot 348 diameter and the outgoing laser beam 191 will, thus, not limit the resolution in the track direction, but will define the readout resolution in a cross data track 103 direction (radially).

In another embodiment, the media 107 comprises a storage readout layer 204 that may function in a manner such that when heated by an optical spot 348 to an appropriate temperature, flux from the data domain marks 281 in the storage layer 202 below couple to align the magnetic domains in the readout layer 204 above. However, unlike in the embodiment described above, when power to the outgoing laser beam 191 is turned off, the magnetic domains in the copy layer 204 remain in an aligned orientation. In this embodiment, the pre/erase magnet 1064 may be positioned on a trailing edge of the head 106 for subsequent realignment/erasure of the magnetic domains in the copy layer 204. In an exemplary embodiment, the pre/erase magnet 1064 comprises a rare earth material such as to provide sufficient magnetic field strength for the realignment/erasure. In other embodiments, tt is understood that the pre/erase magnet 1064 could also be located on a leading edge of the head elements 106 or on or off the head 106. Because the magnetic domains remain oriented in the readout layer 204 until erased, it can be understood that in this embodiment, the thermal aperture 580 described above does not need to be relied upon for readout. The room temperature coercivity of the read layer 204 is chosen so as not to affect the storage layer 202 but so it can be erased by the pre/erase magnet 1064. In this alternative embodiment, because the magnetic domains in the readout layer 204 remain aligned until erased, fabrication of the head elements S1, MR, S2 is made easier since the elements do not need to be situated close to the optics 446.

In yet another embodiment, the media 107 may comprise a single layer of amorphous magnetic material. In this embodiment, a relatively thick (~100 nm) single layer of a suitable rare earth-transition metal (RE-TM) can be tailored for both laser-assisted thermomagnetic writing and readout by the elements comprising the head 106. A composition of the ferrimagnetic RE-TM film is chosen such that the compensation temperature is near room temperature, providing high coercivity for safe storage of the media 107 and diminished coercivity at elevated temperature to enable writing. This same design will have near-zero remanent magnetization (and no read signal) near room temperature, and sufficient magnetization for selective readout of the data track (with little adjacent track crosstalk) at the moderately elevated temperature of the reading beam. Such a media is described by Katayama et al., in an article entitled "New Magnetic Recording Media Using Laser Assisted Read/Write Technologies," presented in paper 13-B-05 at MORIS-Magneto-Optical Recording International Symposium '99, on Jan. 10–13, 1999 at Monterey, Calif. USA, which is incorporated herein by reference.

In summary, the outgoing laser beam 191 and the reflected laser beam 192 are used as part of an optical servo system to keep the flying head 106 centered over a particular data track. Unlike prior art optical drives, the outgoing laser beam 191 is used to heat the storage and readout layers 202, 204. The readout layer, when heated to a lower temperature than the writing temperature, copies data domain marks 281 from the storage layer 202 to the readout layer 204 such that the flying head 106 can sense the orientation of the magnetic domains within the aperture 580. Although the dimension of the elements comprising the head 106 are wider than the data track 103 pitch, the temperature profile formed by the outgoing laser beam 191 will preferably define the edges of the written data domain marks 281 (in the cross track direction). Thus, it is possible to read the data domain marks 281 more narrowly than they can be written, increasing the in track storage density of the system 100.

In practice, however, it may be possible that the heat applied by the outgoing laser beam 191 to the layers 202, 204 may tend to diffuse during the transit time the heated region travels under the edge of the head elements P1, P2, C, S1, MR, S2. Heat diffusion is desired such that the aperture 580 can be formed to extend far enough under the elements head elements P1, P2, C, S1, MR, S2 for reading and writing. However, because of heat diffusion, the thermal gradients that create the aperture 580 may not be steep and hence the edges of the data domain marks 281 may not be well controlled or defined. For reading of data by the head elements S1, MR, S2 the data domain marks 281 should preferably comprise straight edges and should not overlap between data tracks 103.

In general, the layers 202, 204 will have different rates of heat diffusion in vertical (axial) and lateral (in plane) directions.

To understand the lateral diffusion heating process, heating a surface of the disk 107 with the outgoing laser beam 191 may be analogized to that of pouring of a viscous fluid on a flat moving surface, wherein the height of the fluid above the surface corresponds to temperature. It can be understood from this analogy that the fluid would spread out in all directions such that the isoclines of a lateral temperature profile of constant height would look like an expanding teardrop. An exemplary lateral temperature profile 279 formed by the outgoing laser beam 191 was illustrated in FIG. 4h.

To understand the vertical diffusion process, the temperature profile 279 as shown in FIG. 5a, the disk 107 can be analogized as a screen through which the fluid can flow. The vertical flow causes the gradients (rate of change of fluid height) to be more steep. When the vertical flow is high, adjacent data tracks 103 on the disk 107 would see little heat, which is analogous to the fluid height. Thus, if one cannot adjust the vertical to lateral diffusion ratio, adjacent data tracks 103 may be overwritten and/or irregularly shaped data domain marks 281 marks may be formed. One would, thus, like to control the formation of the data domain marks 281 for proper reading by the elements S1, MR, S2.

The present invention identifies that by providing channels or mesas 266 between data tracks 103 of the disk 107, undesired effects of the aforementioned vertical and lateral heat diffusion can be minimized and/or controlled by blocking and/or directing thermal conduction between data tracks 103 of the disk 107 to thereby provide improved writing and reading by the head 106 elements. Use of channels or mesas 266 will be discussed below, but first a further discussion of the pits 215 is provided.

Referring now to FIGS. 6a–d, steps for the formation of a pattern of raised and depressed features and the subsequent transfer of the features to the substrate 245 of the disk 107 is seen. The steps may include: the use of conventional injection molding technology to make a plastic substrate of a material such as polycarbonate or alternate techniques such as the embossing of a relatively thin polymer layer on a substrate of polished glass or aluminum. Alternatively, features may be defined by applying a photo sensitive mask layer on a substrate such as glass or aluminum, photo lithographically defining the desired regions and the photo sensitive layer, and etching the substrate by means such as reactive ion etching or ion milling followed by removal of the photo sensitive layer. A further alternative would be applying a photo sensitive layer of a desired thickness to a substrate material, and defining the pits directly in the photo sensitive layer by means of a photo lithographic step. Other approaches to defining a pit pattern in the substrate of other types of drives, including magneto optical, optical, or magnetic can be defined, or have already been defined and do not comprise a restraint on or a part of this invention.

For all the techniques described above and other similar techniques, except for differential etching into a glass substrate, the features may be defined in a relatively soft substrate, typically either plastic or aluminum or equivalent, for example, as in an embodiment utilizing pits 215. For the later differential removal step, of which the example to be discussed is chemical mechanical polishing (CMP), a relatively hard and polish resistant layer is needed over the substrate in order to define as nearly as possible the finished elevation of the disk being prepared.

Figure 6A:
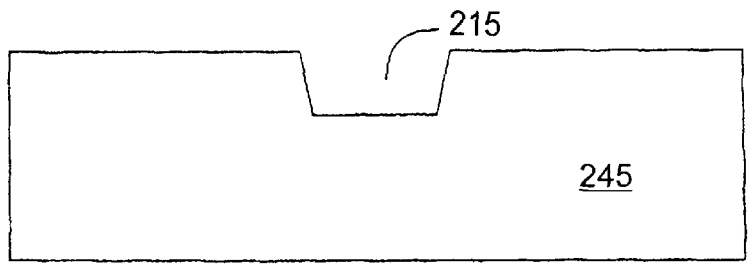
In FIGS. 6a–d, steps for the formation of a servo pattern is seen.
Figure 6B:
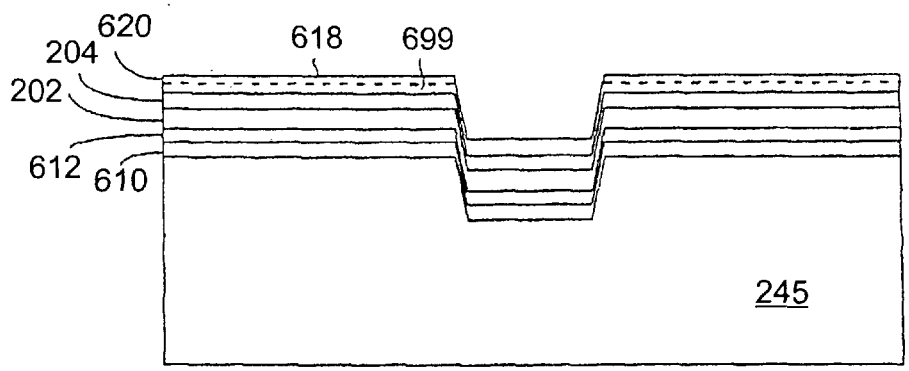

For example, in FIGS. 6a–6d in the disk 107 of the present invention, a sequence of layers to control thermal, magnetic, and optical performance of the recording layer may be used. Such layers in a typical first surface design may include: a lower thermal spreader layer 610, for example, such as aluminum; a bottom dielectric layer 612, the storage layer 202; the readout layer 204; and a top dielectric layer 620. In an exemplary embodiment, the thickness of each of these layers is about 50 nm. As will be discussed, the dielectric layer 620 may comprise a silicon nitride layer 699 and/or sputtered silicon dioxide layer 618 which are both relatively polish resistant and thus can potentially function as a hard layer to the differential removal process. The cross-section after this step is shown in FIG. 6b. Once again, it must be remembered that this is just an exemplary sequence of layers and that the present invention is not limited to use with such a sequence of layers, but rather can be easily adapted for use with other magneto optical, optical, or magnetic recording disks. For example, a silicon nitride layer (not shown) may be used between the substrate 245 and the thermal spreader layer 610 in an embodiment where the substrate is relatively soft.

In a conventional embossing process for optical data storage disks, the depth of each pit is typically about ¼ wavelength of, for example, red light, or about 160 nm deep. With conventional pits, therefore, variations in the pit depth tolerances may result in variations in a detected reflection signal. In contrast, in the present invention, the signal 149 (FIG. 1) derived from the pits 215 may be a function of the reflectivity of a filler material and not the relatively tight tolerances required for the pit depth in the prior art.

Figure 6C:
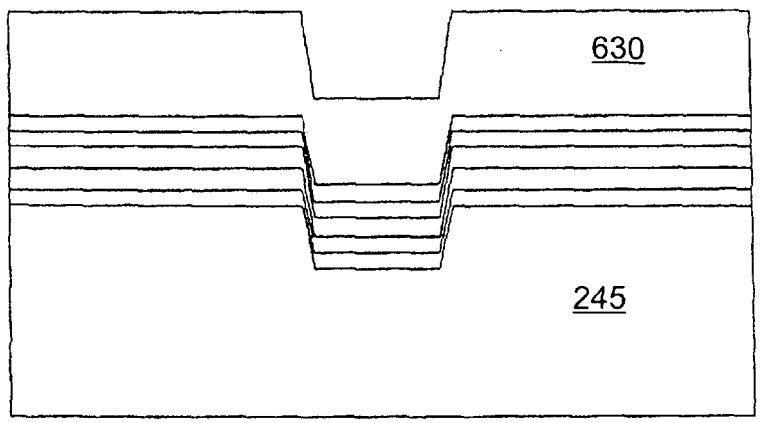

In the preferred embodiment, both the silicon dioxide layer 618 and the silicon nitride layer 699 are used. The silicon dioxide layer is used as a sacrificial layer to insure that a correct layer thickness remains at the end of the chemical polishing or other etching process described below. In the preferred embodiment, a filler material 630 is deposited, or otherwise laid down on top of the layers 610, 612, 202, 204, 618, 699. For example, one filler material 630 could be sputtered aluminum or aluminum alloy. An exemplary thickness is about twice the depth of each pit 215, for example, for a pit depth of about 160 nm, the thickness of the filler material 630 is about 300 nm. The cross-section of the substrate 245 with the deposited filler material 630 is shown in FIG. 6c. In a next step, the disk 107 is subjected to a differential removal process which, removes the filler material 630 but is stopped or substantially stopped by the harder silicon dioxide layer 618. A useful process is polishing with a CMP process developed for the IC industry such as described in a paper by WANG et al., "Chemical-Mechanical Polishing Of Dual Damascene Aluminum Interconnects Structures", Semiconductor International, 1/95. This process uses commercially available equipment and materials to provide polishing selectivity of about 100 between the filler material 630 and the silicon dioxide layer 618. Thus, in this particular example, in polishing all 300 nm of the filler material and with 50% over polishing, less than 2 nm of the sacrificial silicon dioxide layer 618 is preferably removed. The resulting surface is substantially flat, but now, with filler material 630 filling the pits 215. The silicon dioxide layer 618 is next etched with a wet chemical etchant, which preferably does not appreciably etch the underlying silicon nitride layer 699.

Figure 6D:
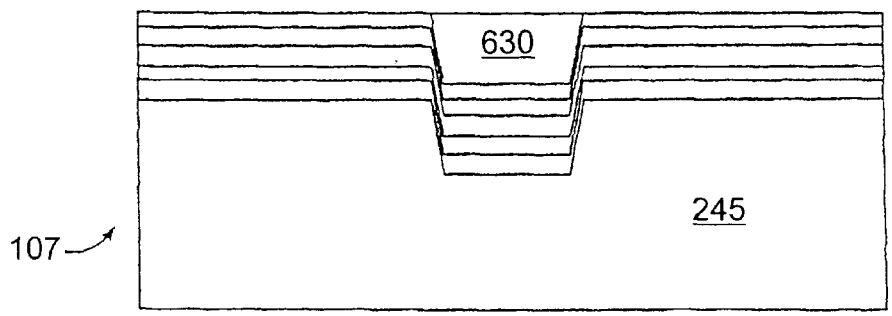

Preferably, after these last steps, the surface of the disk 107, as shown in FIG. 6d, should have a maximum height disturbance approximately the same as the thickness of the layer 620 (perhaps 10–15 nm) or in an exemplary embodiment, about a factor of 10 less than the prior art. Thus, in contrast to the prior art, the disk 107 of the present invention presents a surface to the flying head 106 that is disturbance free, which allows the head to fly stable and/or with a reduced flying height, which those skilled in the art will recognize as being beneficial for near field type optical data storage applications as well as the flying head 106 of the present invention. Because the pits 215 are now filled with reflective material, the reflected signal 192 will have a larger amplitude over that of the prior art diffraction servo tracking method, for example, in an exemplary embodiment, 3 times larger. Furthermore, the pits 215 of the present invention do not present cavities subject to contamination from sources such as particulate matter from the disk 107 itself, for example, disk lubricant, deposition of which would degrade the signal 149 over time.

In a further improvement, if a small reduction in the silicon nitride layer 699 thickness can be tolerated, then no sacrificial dioxide layer 618 would be needed, and the top surface would be even more flat and smooth.

Referring now to FIG. 7a, there is seen a signal derived from pits comprising a constant radius. As described previously, the servo sector 212 of the present invention may or may not utilize an automatic gain control field (AGC). If an AGC field is not used and if the pits are of constant size over the radii of a corresponding disk, a signal derived from the pits may vary because of the slower velocity at an inner radius vs. an outer radius of the disk. FIG. 7a illustrates a representative unfilled pit and a representative servo signal derived therefrom at both an outer radius and an inner radius of a corresponding disk. It is seen that the pulse width of the signal may vary, a characteristic which may affect the accurate positioning of a head over the disk.

Referring now to FIG. 7b, signals derived from pits comprising a nonconstant radius are seen. In the preferred embodiment, the pits 215 may comprise a dimension such that the dimension is proportional to the radius of the disk 107 at which the pits 215 are disposed, for example, a dimension comprising a reflective surface area or a radius. The signal 149 derived from the pits 215 of FIG. 7b will, thus, preferably comprise a similar pulse width, irregardless of the position of the pits 215 on the disk 107. Consequently, variations in the servo signal 149 derived from the pulses from the pits 215 may be minimized. In an embodiment of the system 100 that utilizes a digital servo channel in which the pulses are sampled and integrated, a reduced sampling rate could, thus, be utilized since the pulse width obtained from the outer diameter could preferably be made to be the same as the wider pulse width obtained from the inner diameter of the disk 107. It is understood that pits that comprise a dimension that is proportional to the radius of the disk 107 at which they are disposed could also find utility in an embodiment in which they are not filled with a filler material, such as in a drive that utilizes diffraction rather than reflection from the pits.

Referring now to FIG. 8a, there is seen an end on view through a substrate comprising raised and depressed features. FIG. 8a illustrates that the process for filling the pits 215 may be also be used to fill the channels 266. Thus, some of the same benefits derived from filling the pits 215 with the filler material 630 may also apply to filling the channels 266, for example the benefit of providing a flat surface for maintaining a flying head 106 over the disk 107 as well as the benefit of providing a reduction in the accumulation of contaminants.

Filled channels or mesas 266 between data tracks 103 of the disk 107 provides the present invention with further benefits. It can be seen by further analogy that highly conductive and high heat capacity filler material like aluminum or metal in a channel 266 between data tracks 103 may act like a heat sink, whereas a low conductivity and low heat capacity filler material as discussed below may act like a vertical wall between data tracks 103 to block radial heat flow.

Simulations show that highly conductive filler material 630, such as aluminum, causes the heat generated by the spot 348 to diffuse, which in turn may cause the geometry of the data domain marks 681 to lose their preferred rectangular or square shape during writing of the marks. On the other hand, a low conductive fill material may cause the data domain mark edges to be more straight and thus in an approximation, perpendicular to the channels 266 and stopping at the channels. Consequently, aluminum may not be the best choice for the filler material 630.

In an exemplary embodiment, the channels 266 between data tracks 103 comprise a relatively narrow width and an aspect ratio of more than 5 to 1, which may limit the vertical dimensions of the channels 266 to between 100 and 1000 nm. Some known type of filler materials that are reflective when deposited as thin layers and that may support these dimension and aspect ratios includes metals (i.e., the aforementioned aluminum) and certain types of dye polymers. However, as discussed above, metal acts undesirably as a heat sink. Dye polymers exhibit low conductivity and thus are usable as filler material, however, they are more difficult to polish. Because glass has low conductivity, it is another material which could be used, however, glass would be usable in an embodiment in which increased reflection is not preferred, for example, such as in an optical drive that utilizes diffraction information for servo tracking.

Figure 8F:
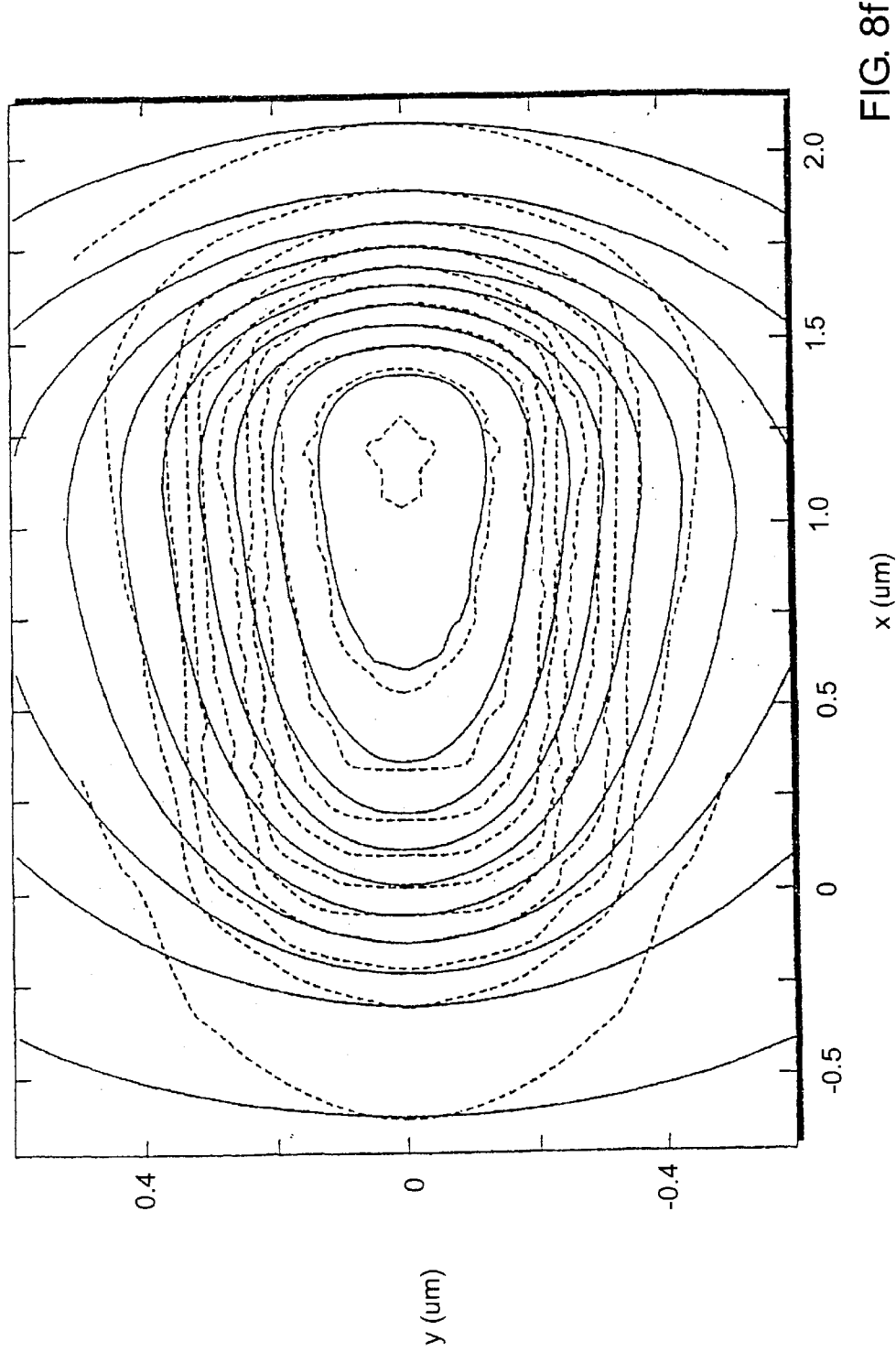
In FIG. 8a, a substrate comprising raised and depressed features is seen.
In FIGS. 8b–e, simulations of heat diffusion resulting from application of an outgoing laser beam to a media comprising no channels and channels are seen.

Referring now to FIGS. 8b–e, simulations of heat diffusion resulting from application of an outgoing laser beam to a media comprising no channels and channels are seen. As discussed above, application of a beam of light to a media in the prior art may result in a temperature profile that affects formation of the data domain marks 281 undesirably. FIGS. 8b–c illustrates temperature profiles of a typical aperture as would be formed in the prior art, while FIGS. 8d–e illustrates temperature profiles that are formed when using a disk 107 comprising the channels 266. As seen by overlaying respective temperature profiles in FIG. 8f, the temperature gradients are steeper in a disk that comprises the channels 266 of the present invention. Consequently, the data domain marks 281 are better defined and formed in the in track and cross track directions. It is seen, therefore, that the channels 266 of the present invention act to direct and control thermal diffusion such that the data domain marks 281 will better exhibit a preferred rectangular or square geometry such that a greater flux density will be provided to the head 106 S1, MR, S2 elements during reading of data. By confining the data domain marks 281 in the cross-track direction, uniform background noise into the head element MR can be minimized during wide writing and narrow reading, which permits a higher storage data density over that of the prior art.

Figure 9A:
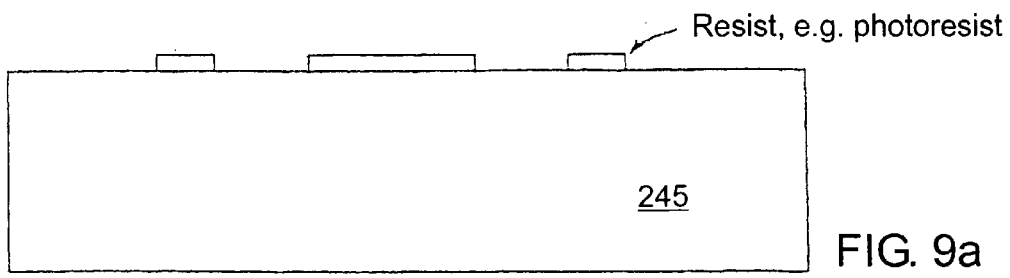
In FIGS. 9a–e, formation of a disk comprising mesas and raised features is seen; and In FIGS. 9f–i, representations of temperature profiles in a disk comprising mesas and no mesas is seen.
Figure 9B:
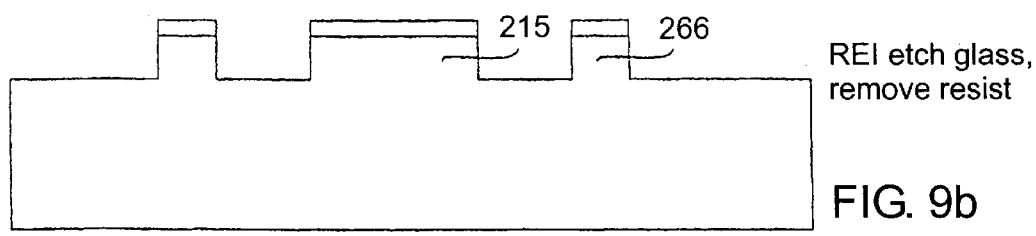
Figure 9C:
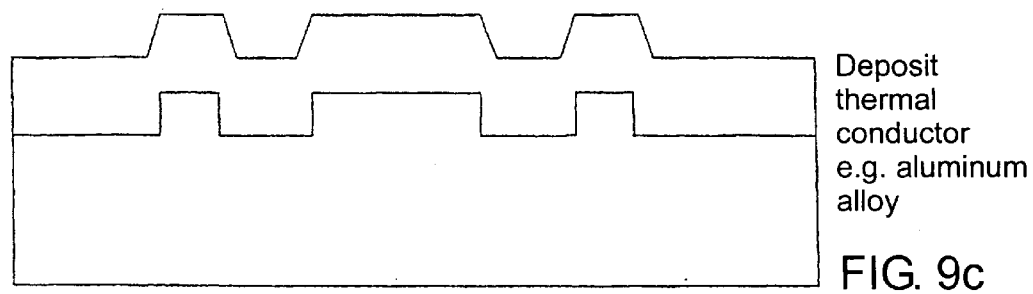
Figure 9D:
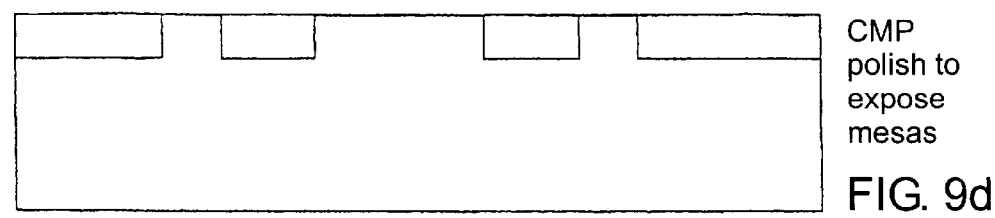
Figure 9E:
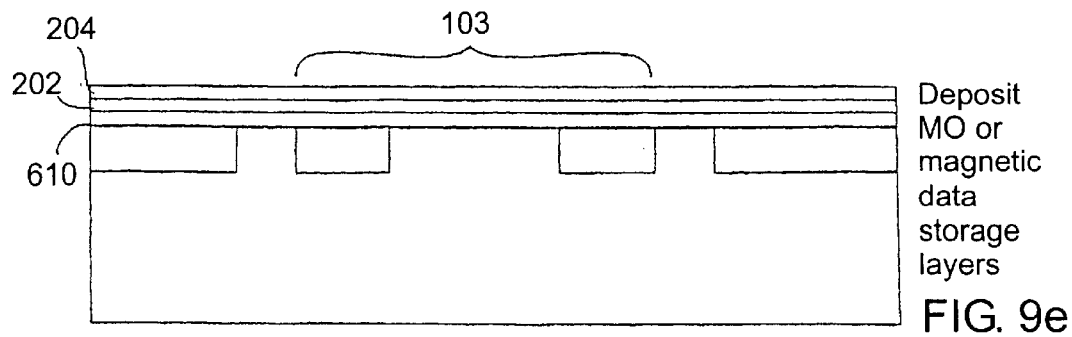

Referring now to FIGS. 9a–e, a disk comprising mesas and raised features is shown. FIGS. 9a–e illustrate a different approach to channel heat generated by an optical spot 348, whereby the data tracks 103 (FIG. 9e are disposed between mesas 266 rather than between channels. In this embodiment, the mesas 266 may comprise the same material as the substrate 245, for example, glass. In fabricating the mesas 266, the process may include using negative resist to reverse master a disk format to include formation of the servo sector 212 patterns as well as the mesas 266. It is understood that in this embodiment the servo sector 212 patterns may comprise raised features 215 rather than the pits.

Recall that above, the disk 107 may comprise layers of materials that are deposited in the following order: aluminum (FIG. 9c) which is removed to a planar level using e.g. CMP polishing (FIG. 9d), a bottom dielectric layer 610, a storage layer 202, a readout layer 204, a top dielectric layer. An exemplary fabrication process for a disk 107 comprising mesas 266 may therefore comprise: mastering a glass substrate 245 so that the mesas 266 and servo patterns 212 comprise a feature depth of between 50 and 100 nm (FIG. 9b), depositing an aluminum or permalloy (nickel and iron) layer 610 on the substrate 245 (FIG. 9c) and chemically mechanically polishing the aluminum or permalloy using a surface of glass substrate 245 as an etch stop (FIG. 9d), depositing (FIG. 9e) a dielectric layer 610 a storage layer 202 and a readout layer 204, and depositing a silicon nitride 699 passivation layer (not shown in FIG. 9e).

The mesas 266 preferably act to interrupt thermal conduction of the thermally conductive aluminum layer 610 radially. Because the recording layers 202, 204 are relatively thin, about 20% less thermally conductive as the underlayer, they couple thermally to aluminum layer 610. Hence, even though there may be some radial heat conduction through the recording layers 202, 204; there will be a thermal conduction discontinuity at the edge of the mesas 266 between the tracks to provide a good heat barrier.

It is expected that about 50% of the outgoing laser beam 191 will pass through the recording layers 202, 204. The outgoing laser beam 191 will either be reflected by the aluminum at the center of the track 103 or get absorbed by the substrate 245. Typically, about 20% of the incident light will be reflected at the center of the track 103 and only about 10% of the incident light will be reflected at the mesas 266. Thus, depending on requirements, a tradeoff between incident light absorption versus servo signal 149 may be required. It is understood that this difference in reflection may be used for servo tracking in an embodiment that utilizes diffraction information.

Referring now to FIGS. 9f–i, a representation of temperature profiles in a disk comprising mesas and no mesas is shown. FIGS. 9f,g,i show an exemplary temperature profile distribution in the disk 107 for three snapshots in time at 90, 150, and 60ns after the outgoing laser beam 191 is applied as a 3 ns and 1 mW focused spot 348 with a full width half height maximum (FWHM=550 nm) at the track 103 center (upper left corner of each plot). The media 107 depth is in the Y direction and the radial direction of the disk is in the X direction. The left edge of the plot is a half-track point of 350 nm. The disk 107 film structure is 85 nm of silicon nitride, 20 nm of a storage and readout layer, 55 nm of aluminum on a polycarbonate substrate. The mesa 266 extension of the substrate rises to the bottom of the storage and readout layer so that the aluminum layer is broken. The width of the mesa is about 80 nm, which is centered at about 20 percent from the right edge of FIGS. 9f,g, and i.

Figure 9H:
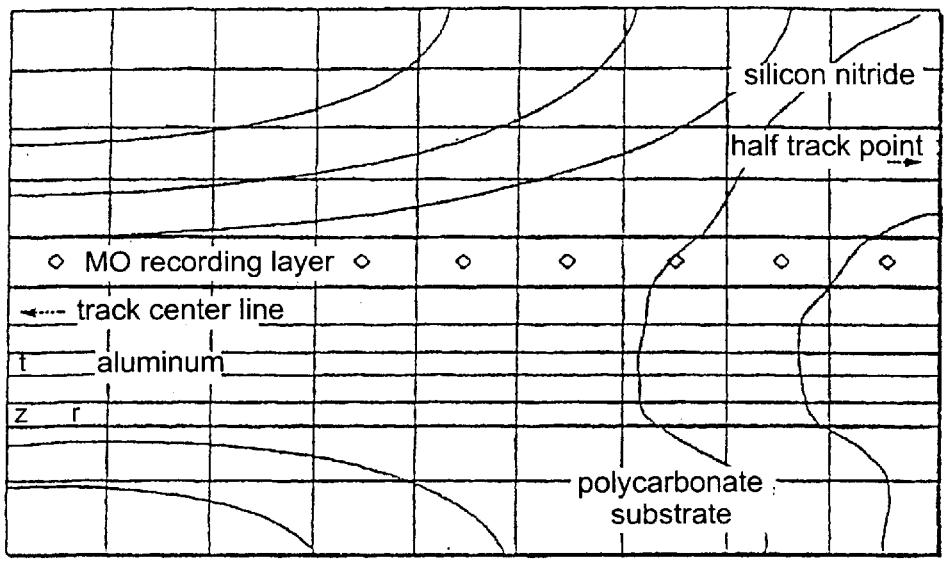
Figure 9I:
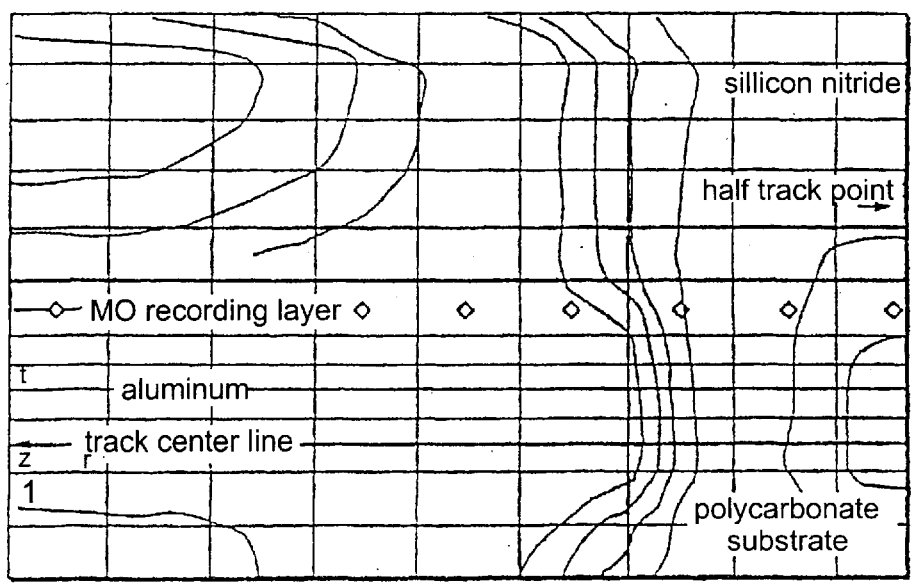

FIG. 9h shows the vertical temperature profile distribution in a disk with no channels or mesas at 60 ns after an outgoing laser beam is applied. The thermal gradients in the disk are very low. The Figures show that before FIG. 9a. This shows that for a disk 107 comprising mesas 266, that the temperature profile distribution at the storage and read layers is quite uniform at the track 103 center and that the thermal gradients are steep at the edge of the track.

In an exemplary embodiment, where continuous power is applied to generate heat, the heat will propagate as a wave between the mesas 266, with the heat remaining between the mesas 266 at four microns, or one microsecond after the spot 348 passes under the head 106 read/write elements, as is desired.

Other features and advantages of the present invention will become apparent to a person of skill in the art who studies the present invention disclosure. Therefore, the scope of the present invention is to be limited only by the following claims.

What is claimed is:

1. A storage disk, comprising:
   a substrate, said substrate comprising a top surface and a bottom surface, said top surface and said bottom surface defined by raised surface portions and depressed surface portions, said raised surface portions of said top surface and said raised surface portions of said bottom surface disposed along planes that are substantially in parallel opposition to each, and said depressed surface portions disposed between said planes;

at least one layered first material, said at least one layered first material comprising a top surface and a bottom surface, said bottom surface of said at least one layered first material disposed above said raised surface portions and above said depressed surface portions, and said top surface of said at least one layered first material disposed to extend above said raised surface portions and above said depressed surface portions;

a layered second material; said layered second material comprising a top surface and a bottom surface, said bottom surface of said layered second material disposed above said top surface of said at least one layered first material and above said depressed surface portions, and said top surface of said layered second material disposed above said raised surface portions and above said depressed surface portions;

and a layered third material, said layered third material comprising a top surface and a bottom surface, said bottom surface of said layered third material disposed above said top surface of said layered second material and above said depressed surface portions, and said top surface of said layered third material disposed to be substantially level with said top surface of said layered second material.

2. The storage disk as recited in claim 1, wherein said layered third material is selected from a group of: a metal material, polymer material, a transparent material.

3. The storage disk as recited in claim 1, wherein said storage disk comprises a topmost surface and a bottommost surface, wherein said topmost surface and bottommost surface are substantially flat over said topmost and said bottommost surfaces.

4. The storage disk as recited in claim 1, wherein said at least one layered first material comprises a storage layer and a readout layer.

5. The storage disk as recited in claim 1, wherein said at least one layered first material comprises a magnetic material.

6. The storage disk as recited in claim 1, wherein said raised surface portions and said depressed surface portions comprise a servo pattern.

7. The storage disk as recited in claim 1, wherein said storage disk comprises a plurality of data tracks, wherein said raised features comprise mesas, and wherein said mesas are disposed between said plurality data tracks.

8. The storage disk as recited in claim 1, wherein said storage disk comprises a plurality of data tracks, wherein said raised features comprise channels, and wherein said channels are disposed between said plurality data tracks.

9. A first surface storage disk comprising:
a disk substrate, said disk substrate comprising a substrate, said surface comprising raised features and depressed features, said raised features comprising a topmost level; and a filler material, wherein said filler material is disposed in said depressed features to a level substantially equal with said topmost level of said raised features to define a mechanically flat surface having thermal anisotropy, the disk further comprising a planar data storage layer overlying said topmost level.

10. The disk as recited in claim 9, wherein said raised features comprise a servo pattern, and wherein said light is reflected from said servo pattern.

11. The disk as recited in claim 9, further comprising a storage layer disposed above said surface, and a source of light, wherein said light is directed along an optical path between said source and said disk substrate to heat said storage layer.

12. A method of utilizing a storage disk substrate that comprises raised and depressed features, comprising the steps of:
defining said substrate to comprise raised and depressed features;

depositing a filler material over an etch stop surface to a depth sufficient such that said depressed features are filled to a height substantially equal or above said etch stop surface; and differentially removing said filler material so that said filler material over said etch stop surface is removed with little or no removal of said etch stop surface to leave a substantially planar surface comprising said filler material and said etch stop surface.

13. The method as claimed in claim 12 including the further step of:
depositing a sacrificial layer over said etch stop surface before depositing said filler material; and wherein said differential removing step substantially etches said filler material and said sacrificial layer to leave a substantially planar surface comprising said etch stop surface and said filler material.

14. The method of claim 13, wherein said etch stop layer comprises silicon nitride and wherein said sacrificial layer comprises silicon dioxide.

15. The method of claim 12, wherein said filler material is selected from a group of: a metal material, polymer material, a transparent material.

16. A storage disk, comprising:
a disk substrate, said disk substrate comprising a surface, said surface comprising raised features and depressed features, said raised features comprising a topmost level; and a disk substrate leveling means for leveling said depressed features to a level substantially equal to a topmost level of said raised features to define a mechanically flat surface having thermal anisotrophy.

17. A storage disk as claimed in claim 16 wherein the raised features comprise a storage layer, and the leveling means comprise a thermally conductive material, the raised features interrupting thermal conductivity of the leveling means.

18. A storage disk as claimed in claim 17 wherein the thermally conductive material comprises aluminum or aluminum oxide.

19. A storage disk as claimed in claim 17 wherein the storage layer is atop the raised features.

20. A magneto optical storage disk substrate wherein the substrate comprises mesas of the same material as the substrate, depressions being defined between said mesas, the mesas having a top surface level defining a top surface of an aluminum filler material between the mesas, and having no aluminum overlying the mesas, a planar storage layer over the aluminum and the mesas, and a planar readout layer over the planar storage layer.

21. A storage disk as claimed in claim 20 wherein the mesas are defined to interrupt thermal conduction of the thermally conductive aluminum between the mesas.

22. The disk as claimed in claim 21 wherein the recording storage layers are relatively thin and couple thermally to the aluminum.

23. A disk as claimed in claim 22 wherein said data storage and data readout layers comprise silicon nitride and silicon dioxide respectively.

24. A method of forming a storage disk comprising:
on a substrate, forming a master pattern of raised features with depressions defined between the raised features, depositing a material in said depressions and over said raised features, depositing a relatively hard layer which is relatively polish or etch resistant relative to the first sacrificial layer, polishing or etching the layers down to a level defined by a top surface of the mesas on said substrate so that the first filler material fills the depressed regions between the mesas but does not cover the top surface of the mesas, the mesas thereby being exposed, and depositing magnetic data storage layers over the mesas and the filler material between the mesas.

25. A method as claimed in claim 24 including the further step of depositing a filler over said storage and readout layers to a sufficient depth that the lowest portion of the filler material is higher than the highest layer of the hard etch stop layer, and thereafter removing the filler material to planarize the surface so that the filler material remains in any depressed region of the substrate over the storage and readout layers, the material being planar with a top surface of the raised features.

26. A method as claimed in claim 25 wherein the filler layer comprises aluminum or aluminum alloy.

27. A method as claimed in claim 26 wherein the data storage layers comprise silicon dioxide or silicon nitride or a similar dielectric layer.

28. A method as claimed in claim 27 wherein the aluminum is removed to a level equal to a planar surface with the silicon dioxide, with the silicon dioxide layer being a sufficient thickness to allow for some small level of over-polishing.

29. A method as claimed in claim 28 wherein the silicon nitride layer is protected and the silicon dioxide layer partially remains and is partially removed and the aluminum which fills the depressions rises only to a level substantially equal to the very flat remaining surface of the silicon dioxide.

* * * * *